(12) United States Patent
Qiu

(10) Patent No.: US 11,454,996 B2
(45) Date of Patent: Sep. 27, 2022

(54) ELECTRONIC CIGARETTE TEMPERATURE CONTROL SYSTEM AND METHOD, AND ELECTRONIC CIGARETTE WITH THE SAME

(71) Applicant: JOYETECH EUROPE HOLDING GMBH, Zug (CH)

(72) Inventor: Wei-Hua Qiu, ChangZhou (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 782 days.

(21) Appl. No.: 16/395,576

(22) Filed: Apr. 26, 2019

(65) Prior Publication Data
US 2019/0246699 A1 Aug. 15, 2019

Related U.S. Application Data

(60) Division of application No. 15/623,396, filed on Jun. 15, 2017, now Pat. No. 10,321,718, which is a continuation-in-part of application No. PCT/CN2015/087597, filed on Aug. 20, 2015.

(30) Foreign Application Priority Data

Jan. 22, 2015 (CN) .......................... 201510033982.9

(51) Int. Cl.
*A24F 13/00* (2006.01)
*G05D 23/24* (2006.01)
*A24F 40/57* (2020.01)
*G05D 23/19* (2006.01)
*A24F 40/10* (2020.01)

(52) U.S. Cl.
CPC ......... *G05D 23/2401* (2013.01); *A24F 40/57* (2020.01); *G05D 23/1917* (2013.01); *G05D 23/1919* (2013.01); *G05D 23/24* (2013.01); *A24F 40/10* (2020.01)

(58) Field of Classification Search
CPC ...................................................... A24F 47/00
USPC ................................................ 131/328–329
See application file for complete search history.

(56) References Cited

U.S. PATENT DOCUMENTS

2014/0014126 A1* 1/2014 Peleg ...................... A24F 40/50
374/54

* cited by examiner

*Primary Examiner* — Phuong K Dinh
(74) *Attorney, Agent, or Firm* — ScienBiziP, P.C.

(57) ABSTRACT

An electronic cigarette includes a processor, a heating element, and a power supply. The heating element is electrically coupled to the processor. The power supply is electrically coupled to the processor and the heating element. The processor is configured to calculate a resistance value $R_L$ of the heating element before the heating element is powered on, determine whether the resistance value $R_L$ of the heating element is within a predetermined range, and determine whether a temperature control mode is selected when the resistance value $R_L$ of the heating element is within the predetermined range. The processor is configured to determine whether the heating element is adapted to the temperature control mode when the temperature control mode is selected, and control the heating element to work in the temperature control mode when the heating element is adapted to the temperature control mode. A related temperature control method is also provided.

20 Claims, 23 Drawing Sheets

ELECTRONIC CIGARETTE TEMPERATURE CONTROL SYSTEM AND METHOD, AND ELECTRONIC CIGARETTE WITH THE SAME

FIELD

The subject matter herein generally relates to tobacco substitutes, and particularly, to an electronic cigarette temperature control system and method, and electronic cigarette with the same.

BACKGROUND

Electronic cigarette, also known as virtual cigarette, has a taste similar to cigarettes.

However, with increasing of the output voltage or output power of a battery assembly of the electronic cigarette and decreasing of the resistance of a heating member of the atomizing device, the temperature of the heating member becomes higher. An excessive temperature of the heating member may lead the smoke liquid, the wax, or the tobacco to produce and release substances which are harmful to health.

SUMMARY

The present disclosure provides an electronic cigarette temperature control system and method, and an electronic cigarette with the same for controlling the temperature of the heating element within a range.

An object of the present disclosure is to provide an electronic cigarette temperature control system which can include a power supply, a heating element, at least one temperature detection element, and a processor. The power supply can be electrically coupled to the heating element and the processor. The at least one temperature detection element can be electrically coupled to the processor. The at least one temperature detection element can be configured to detect a change of a temperature T of the heating element, and output the change of the temperature T of the heating element to the processor. The processor can be configured to determine the temperature t of the at least one temperature detection element according to an associated physical quantity x of the at least one temperature detection element, and calculate the temperature T of the heating element according to the temperature t of the at least one temperature detection element.

In an alternative embodiment, the at least one temperature detection element can be selected from one of a group consisting of a positive temperature coefficient (PTC) thermistor, a negative temperature coefficient (NTC) thermistor, a bimetallic strip, a thermocouple, a quartz crystal temperature sensor, an optical fiber temperature sensor, an infrared temperature sensor, a P-N junction temperature sensor, and any combination thereof.

In an alternative embodiment, the at least one temperature detection element can be arranged to be adjacent to the heating element.

In an alternative embodiment, the processor can compare the temperature T of the heating element with an upper threshold of an operating temperature $T_H$ of the heating element and a lower threshold of the operating temperature $T_L$ of the heating element as the basis of a calculation, and control the output voltage/the output power from the power supply to the heating element accordingly.

In an alternative embodiment, the associated physical quantity x can be selected from one of a group consisting of a temperature t, a resistance, a voltage, a current, a resonant frequency, an optical power, and any combination thereof.

In an alternative embodiment, each temperature detection element is a PTC thermistor, and the associated physical quantity x of each temperature detection element is a resistance value $R_T$ of the PTC thermistor.

In an alternative embodiment, the electronic cigarette temperature control system can further include a fixed resistor $R_5$ coupled with the at least one temperature detection element in series. A voltage drop across the fixed resistor $R_5$ is $(V_e - V_f)$, a current flowing through the fixed resistor $R_5$ is $(V_e - V_f)/R_5$, voltage drop across the at least one temperature detection element is $V_f$, and the resistance value $R_T$ of the at least one temperature detection element can be expressed by $R_T = R_5 * V_f / (V_e - V_f)$.

In an alternative embodiment, the processor can further include a detecting unit, an operation unit, and a processing unit coupled in sequence.

The detecting unit can be electrically coupled to the at least one temperature detection element. The detecting unit can be configured to detect the voltage drop $V_f$ across the at least one temperature detection element, and output the voltage drop $V_f$ across the at least one temperature detection element to the operation unit.

The operation unit can pre-store a first formula, a relationship between the resistance value $R_T$ of the at least one temperature detection element and the temperature t of the at least one temperature detection element, and a second formula. The first formula is $R_T = R_5 * V_f / (V_e - V_f)$. The second formula is $T = t + \Delta t$. The operation unit can be configured to calculate the temperature T of the heating element according to the voltage drop $V_f$, the first formula, the relationship between the resistance value $R_T$ of the at least one temperature detection element and the temperature t of the at least one temperature detection element, and the second formula, and can further output the temperature T of the heating element to the processing unit.

The processing unit can compare the temperature T of the heating element with the pre-stored the upper threshold of the operating temperature $T_H$ and the lower threshold of the operating temperature $T_L$. The output voltage/the output power from the power supply to the heating element can be controlled accordingly.

In an alternative embodiment, the electronic cigarette temperature control system can further include an input device electrically coupled to the processor. The input device can be configured to provide an interface for a user to input a desired target temperature $T_D$. The desired target temperature $T_D$ can be greater than or equal to the lower threshold of the operating temperature $T_L$ and be less than or equal to the upper threshold of the operating temperature $T_H$, that is $T_L \leq T_D \leq T_H$.

In an alternative embodiment, the electronic cigarette temperature control system can further include a thermostatic switch coupled between the power supply and the heating element. The thermostatic switch can still control the temperature of heating element when the temperature detection element and/or the processor malfunction.

An object of the present disclosure is to provide an electronic cigarette temperature control system which can include a power supply, a thermostatic switch, and a heating element coupled in sequence. The switching temperature $T_M$ of the thermostatic switch can be less than an upper threshold of an operating temperature $T_H$ of the electronic cigarette temperature control system.

In an alternative embodiment, the thermostatic switch can be selected from one of a group consisting of a mechanical thermostatic switch, an electronic thermostatic switch, a temperature relay, and any combination thereof.

In an alternative embodiment, the mechanical thermostatic switch can be a vapor pressure thermostatic switch, a liquid expansion thermostatic switch, a gas adsorption thermostatic switch, or a metal expansion thermostatic switch. The electronic thermostatic switch can be a resistance thermostatic switch or a thermocouple thermostatic switch. The temperature relay can be a thermal reed relay.

In an alternative embodiment, the temperature $t_s$ of the thermostatic switch can increase when the temperature T of the heating element increases. When the temperature $t_s$ of the thermostatic switch is less than a switch temperature $T_M$ of the thermostatic switch, the thermostatic switch can turn on a connection between the power supply and the heating element. The heating element can work normally. The temperature T of the heating element can increase accordingly. When the temperature $t_s$ of the thermostatic switch is greater than the switch temperature $T_M$ of the thermostatic switch, the thermostatic switch can turn off the connection between the power supply and the heating element. The heating element can stop working. The temperature T of the heating element can naturally decrease.

In an alternative embodiment, the thermostatic switch can be arranged to be adjacent to the heating element.

An object of the present disclosure is to provide an electronic cigarette temperature control system which can include a power supply, a heating element, a processor, and a thermostatic switch. The processor can be electrically coupled to the power supply and the thermostatic switch. The heating element can be electrically coupled to the power supply. The thermostatic switch can be arranged to be adjacent to the heating element. The switching temperature $T_M$ of the thermostatic switch can be less than an upper threshold of an operating temperature $T_H$ of the electronic cigarette temperature control system.

In an alternative embodiment, the thermostatic switch can be selected from one of a group consisting of a mechanical thermostatic switch, an electronic thermostatic switch, a temperature relay, and any combination thereof.

In an alternative embodiment, the mechanical thermostatic switch can be a vapor pressure thermostatic switch, a liquid expansion thermostatic switch, a gas adsorption thermostatic switch, or a metal expansion thermostatic switch. The electronic thermostatic switch can be a resistance thermostatic switch or a thermocouple thermostatic switch. The temperature relay can be a thermal reed relay.

In an alternative embodiment, the temperature $t_s$ of the thermostatic switch can increase when the temperature T of the heating element increases. When the temperature $t_s$ of the thermostatic switch is less than a switch temperature $T_M$ of the thermostatic switch, the thermostatic switch can perform action A. When the temperature $t_s$ of the thermostatic switch is greater than the switch temperature $T_M$ of the thermostatic switch, the thermostatic switch can perform action B. The processor can detect the action of the thermostatic switch, and control an output voltage/an output power from the power supply to the heating element according to the action of the thermostatic switch.

In an alternative embodiment, action A can be the thermostatic switch turn on and action B can be the thermostatic switch turn off, and in other embodiments, the action A can be the thermostatic switch turn off and the action B can be the thermostatic switch turn on.

In an alternative embodiment, the thermostatic switch can be arranged to be adjacent to the heating element.

An object of the present disclosure is to provide an electronic cigarette temperature control system which can include a power supply, a heating element, and a processor. The power supply can be electrically coupled to the heating element and the processor. The heating element can be electrically coupled to the processor. The heating element can have temperature coefficient of resistance characteristics. The heating element can directly act as a temperature detection element and output a change of a temperature T of the heating element to the processor.

In an alternative embodiment, the heating element can be made of material selected from one of a group consisting of platinum, copper, nickel, titanium, iron, ceramic-based PTC materials, polymer-based PTC materials, and any combination thereof. The resistance value $R_L$ of the heating element increases with the temperature T of the heating element.

In an alternative embodiment, the processor can determine the temperature T of the heating element according to the resistance value $R_L$ of the heating element. The processor can further compare the temperature T of the heating element with an upper threshold of an operating temperature $T_H$ and a lower threshold of the operating temperature $T_L$. An output voltage/an output power from the power supply to the heating element can be controlled accordingly.

In an alternative embodiment, the electronic cigarette temperature control system can further include a first fixed resistor $R_1$ coupled between the power supply and the heating element. A voltage drop across the first fixed resistor $R_1$ is $(V_a-V_b)$, a voltage drop across the heating element is $V_b$, a current flowing through the heating element is $(V_a-V_b)/R_1$, and the resistance value $R_L$ of the heating element is $R_1*(V_a-V_b)$.

In an alternative embodiment, the electronic cigarette temperature control system can further include a second fixed resistor $R_2$, an amplifier, a third fixed resistor $R_3$, and a fourth fixed resistor $R_4$. The first fixed resistor $R_1$ can be coupled in parallel to a series connection of the second fixed resistor $R_2$, the amplifier, the third fixed resistor $R_3$. The fourth fixed resistor $R_4$ can be coupled with the amplifier in parallel, and the voltage drop $(V_a-V_b)$ across the first fixed resistor $R_1$ is $V_c*R_2/R_4$.

In an alternative embodiment, the processor can include a detecting unit, an operation unit, and a processing unit coupled in sequence.

The detecting unit can be electrically coupled to the fourth fixed resistor $R_4$. The detecting unit can be configured to detect the voltage drop $V_c$ across the fourth fixed resistor $R_4$, and output the voltage drop $V_c$ across the fourth fixed resistor $R_4$ to the operation unit.

The operation unit can pre-store a third formula: $(V_a-V_b)=V_c*R_2/R_4$, a fourth formula: $R_L=R_1*V_b (V_a-V_b)$, and a relationship between the resistance value $R_L$ of the heating element and the temperature T of the heating element. The operation unit can be configured to calculate the temperature T of the heating element according to the voltage drop $V_c$, the third formula, the fourth formula, and the relationship between the resistance value $R_L$ of the heating element and the temperature T of the heating element. The operation unit can be further configured to output the temperature T of the heating element to the processing unit.

The processing unit can compare the temperature T of the heating element with the pre-stored an upper threshold of an operating temperature $T_H$ and a lower threshold of the operating temperature $T_L$. The output voltage/the output power from the power supply to the heating element can be controlled accordingly.

In an alternative embodiment, the electronic cigarette temperature control system can further include an input device coupled to the processor. The input device can be configured to provide an interface for a user to input a desired target temperature $T_D$. The desired target temperature $T_D$ can be greater than or equal to the lower threshold of the operating temperature $T_L$ and be less than or equal to the upper threshold of the operating temperature $T_H$, that is $T_L \leq T_D \leq T_H$.

In an alternative embodiment, the electronic cigarette temperature control system can further include a thermostatic switch coupled between the power supply and the heating element. The thermostatic switch can still control the temperature of heating element when the temperature detection element and/or the processor malfunction.

In an alternative embodiment, the electronic cigarette temperature control system can further include a temperature detection element electrically coupled to the processor or a thermostatic switch electrically coupled to the processor.

In an alternative embodiment, the temperature detection element or the thermostatic switch can be arranged to be adjacent to the heating element.

An object of the present disclosure is to provide an electronic cigarette including any one of the above electronic cigarette temperature control systems.

An object of the present disclosure is to provide an electronic cigarette temperature control method. The electronic cigarette temperature control method applied in an electronic cigarette temperature control system or an electronic cigarette, where the electronic cigarette temperature control system or the electronic cigarette includes a power supply, a heating element, a processor, and at least one temperature detection element. The electronic cigarette temperature control method can include:

The processor can obtain associated physical quantity x of the at least one temperature detection element.

The processor can calculate the temperature T of the heating element according to the associated physical quantity x of the at least one temperature detection element.

The processor can compare the temperature T of the heating element with an upper threshold of an operating temperature $T_H$ and a lower threshold of the operating temperature $T_L$.

The processor can adjust an output voltage/an output power from the power supply to the heating element according to the result of the comparison.

The heating element can work for a period at the adjusted output voltage/the adjusted output power.

In an alternative embodiment, the step "the processor can adjust an output voltage/an output power from the power supply to the heating element according to the result of the comparison" can include:

The processor can control the power supply to reduce the output voltage/the output power to the heating element when the temperature T of the heating element is greater than the upper threshold of the operating temperature $T_H$.

In an alternative embodiment, the step "the processor can adjust an output voltage/an output power from the power supply to the heating element according to the result of the comparison" can include:

The processor controlling the power supply to maintain the output voltage/the output power to the heating element when the temperature T of the heating element is less than a lower threshold of the operating temperature $T_L$ and the output voltage/the output power from the power supply to the heating element reaches a predetermined upper threshold value.

In an alternative embodiment, the step "the processor can adjust an output voltage/an output power from the power supply to the heating element according to the result of the comparison" can include:

The processor controlling the power supply to increase the output voltage/the output power to the heating element when the temperature T of the heating element is less than a lower threshold of the operating temperature $T_L$ and the output voltage/the output power from the power supply to the heating element has not yet reached a predetermined upper threshold value.

In an alternative embodiment, the electronic cigarette temperature control system or the electronic cigarette can further include an input device. The electronic cigarette temperature control method can further include:

Receiving a target temperature $T_D$ inputted by a user via the input device before the processor obtains the associated physical quantity x of the at least one temperature detection element. The desired target temperature $T_D$ may be greater than or equal to the lower threshold of the operating temperature $T_L$ and may be less than or equal to the upper threshold of the operating temperature $T_H$. The desired target temperature $T_D$ can replace the pre-stored upper threshold of the operating temperature $T_H$ and the pre-stored lower threshold of the operating temperature $T_L$. The processor comparing the temperature T of the heating element with the desired target temperature $T_D$.

An object of the present disclosure is to provide an electronic cigarette temperature control method. The electronic cigarette temperature control method can be applied in an electronic cigarette temperature control system or an electronic cigarette. The electronic cigarette temperature control system or the electronic cigarette can include a power supply, a heating element, and a thermostatic switch. The electronic cigarette temperature control method can include:

The thermostatic switch turning on a connection between the power supply and the heating element when a temperature $t_s$ of the thermostatic switch is less than a switch temperature $T_M$ of the thermostatic switch. The heating element accordingly works normally, the temperature T of the heating element accordingly increasing; and The thermostatic switch turning off the connection between the power supply and the heating element when the temperature $t_s$ of the thermostatic switch is greater than the switch temperature $T_M$ of the thermostatic switch. In this case, the heating element stops working, and the temperature T of the heating element naturally decreases.

An object of the present disclosure is to provide an electronic cigarette temperature control method. The electronic cigarette temperature control method can be applied in an electronic cigarette temperature control system or an electronic cigarette. The electronic cigarette temperature control system or the electronic cigarette can include a power supply, a heating element, a processor, and a thermostatic switch. The electronic cigarette temperature control method can include:

The processor detecting an action of the thermostatic switch, where the thermostatic switch performing action A when a temperature $t_s$ of the thermostatic switch is less than a switch temperature $T_M$ of the thermostatic switch, the thermostatic switch performing action B when the temperature $t_s$ of the thermostatic switch is greater than the switch temperature $T_M$ of the thermostatic switch. Where the action A is the thermostatic switch turn on and the action B is the thermostatic switch turn off, and in other embodiments, the action A can be the thermostatic switch turn off and the action B can be the thermostatic switch turn on.

The processor can adjust an output voltage/an output power from the power supply to the heating element according to the action of the thermostatic switch.

The heating element can work for a period at the adjusted output voltage/the adjusted output power.

In an alternative embodiment, the step "the processor adjusting an output voltage/an output power from the power supply to the heating element according to the action of the thermostatic switch" can include:

The processor controlling the power supply to reduce the output voltage/the output power to the heating element when the thermostatic switch performs action B.

In an alternative embodiment, the step "the processor adjusting an output voltage/an output power from the power supply to the heating element according to the action of the thermostatic switch" can include:

The processor controlling the power supply to maintain the output voltage/the output power to the heating element when the thermostatic switch performs action A and the output voltage/the output power from the power supply to the heating element reaches a predetermined upper threshold value.

In an alternative embodiment, the step "the processor adjusting an output voltage/an output power from the power supply to the heating element according to the action of the thermostatic switch" can include:

The processor controlling the power supply to increase the output voltage/the output power to the heating element when the thermostatic switch performs action A and the output voltage/the output power from the power supply to the heating element is less than a predetermined upper threshold value.

An object of the present disclosure is to provide an electronic cigarette temperature control method. The electronic cigarette temperature control method can be applied in an electronic cigarette temperature control system or an electronic cigarette. The electronic cigarette temperature control system or the electronic cigarette can include a power supply, a heating element, and a processor. The electronic cigarette temperature control method can include:

The processor calculating a resistance value $R_L$ of the heating element before the heating element is powered on;

The processor calculating the resistance value $R_L$ of the heating element again after the processor detects that the heating element is powered on.

The processor determining whether the heating element has temperature coefficient of resistance characteristics.

The processor determining whether a temperature control mode is selected.

The processor calculating the resistance value $R_L$ of the heating element.

The processor calculating the temperature T of the heating element according to the resistance value $R_L$ of the heating element.

The processor comparing the temperature T of the heating element with a pre-stored upper threshold of an operating temperature $T_H$ and a pre-stored lower threshold of the operating temperature $T_L$.

The processor adjusting an output voltage/an output power from the power supply to the heating element according to the result of the comparison.

The heating element working for a period at the adjusted output voltage/the adjusted output power.

In an alternative embodiment, the step "the processor determining whether the heating element has temperature coefficient of resistance characteristics" can include:

The processor automatically controlling the power supply to output a constant voltage/a constant power to the heating element or the processor controlling the power supply to output a selected voltage/a selected power to the heating element when the heating element doesn't have temperature coefficient of resistance characteristics; and The processor determining whether a temperature control mode is selected when the heating element has temperature coefficient of resistance characteristics.

In an alternative embodiment, the step "the processor determining whether a temperature control mode is selected" can include:

The processor automatically controlling the power supply to output a constant voltage/a constant power to the heating element or the processor controlling the power supply to output a selected voltage/a selected power to the heating element when the temperature control mode is not selected; and The processor calculating the resistance value $R_L$ of the heating element when the temperature control mode is selected.

In an alternative embodiment, the step "the processor adjusting an output voltage/an output power from the power supply to the heating element according to the result of the comparison" can include:

The processor controlling the power supply to reduce the output voltage/the output power to the heating element when the temperature T of the heating element is greater than the upper threshold of the operating temperature $T_H$.

In an alternative embodiment, the step "the processor adjusting an output voltage/an output power from the power supply to the heating element according to the result of the comparison" can include:

The processor controlling the power supply to maintain the output voltage/the output power to the heating element when the temperature T of the heating element is less than the lower threshold of the operating temperature $T_L$ and the output voltage/the output power from the power supply to the heating element reaches a predetermined upper threshold value.

In an alternative embodiment, the step "the processor adjusting an output voltage/an output power from the power supply to the heating element according to the result of the comparison" can include:

The processor controlling the power supply to increase the output voltage/the output power to the heating element when the temperature of the heating element is less than the lower threshold of the operating temperature $T_L$ and the output voltage/the output power from the power supply to the heating element is less than a predetermined upper threshold value.

An object of the present disclosure is to provide an electronic cigarette executing any one of the above electronic cigarette temperature control method.

The disclosure brings about the following beneficial effects:

The electronic cigarette temperature control system and method, and the electronic cigarette with the same can maintain the temperature of the heating element at a reasonable range, avoiding the production and release of harmful substances. Thus, the electronic cigarette can maintain a good taste, save energy, avoid overheating of the housing of the electronic cigarette, and prevent thermal ageing of the inner components of the electronic cigarette.

The addition of an input device allows the user to set the operating temperature of the heating element according to a need.

The electronic cigarette can execute a double temperature control protection via adding the thermostatic switch coupled between the power supply and the heating element. This is especially important when the temperature detection element and/or the processor malfunction, as the electronic cigarette can still control the temperature of the heating element.

The user can employ the heating element of the atomizer assembly portion which has or doesn't have temperature coefficient of resistance characteristics to execute the temperature control via adding the temperature detection element/the thermostatic switch and the processor. Thus, greater versatility is presented by the electronic cigarette temperature control system and the electronic cigarette.

BRIEF DESCRIPTION OF THE DRAWINGS

Implementations of the present technology will now be described, by way of embodiment, with reference to the attached figures, wherein.

DETAILED DESCRIPTION

Figure 1:
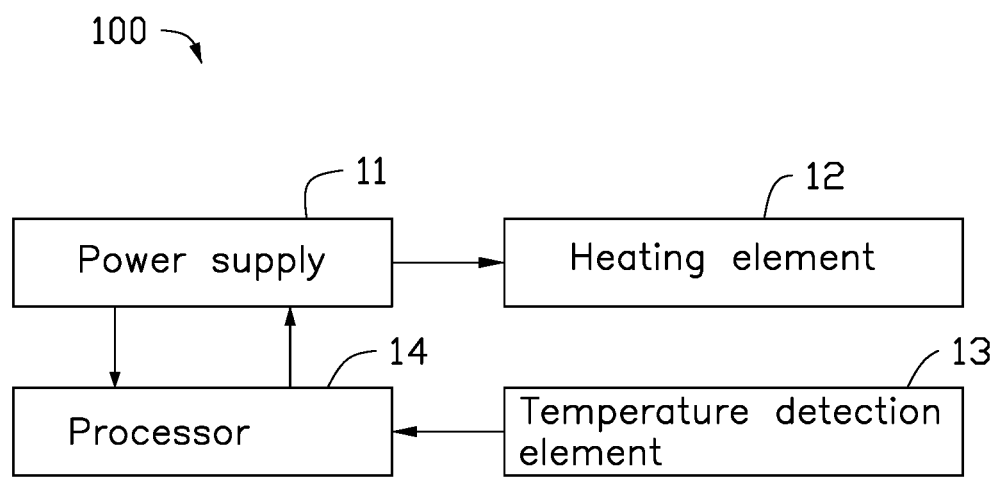
FIG. 1 illustrates a circuit schematic diagram of a first embodiment of an electronic cigarette temperature control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are connected permanently or releasably. The term "comprising" means "including, but not necessarily limited to"; it specifically indicates open-ended inclusion or membership in a so-described combination, group, series and the like.

Embodiments of the present disclosure will be described with reference to the accompanying drawings.

FIG. 1 illustrates a first embodiment of an electronic cigarette temperature control system 100. The electronic cigarette temperature control system 100 can include a power supply 11, a heating element 12, at least one temperature detection element 13, and a processor 14. The power supply 11 can be electrically coupled to the heating element 12 and the processor 14. The at least one temperature detection element 13 can be electrically coupled to the processor 14. The heating element 12 can heat smoke liquid, wax, or tobacco to generate vapor, causing a user to experience a simulation of tobacco smoking after the power supply 11 supplies power to the heating element 12.

The at least one temperature detection element 13 can detect a change of a temperature T of the heating element 12. The temperature t of the at least one temperature detection element 13 can increase when the temperature T of the heating element 12 increases. An associated physical quantity x of the temperature detection element 13 can change when the temperature t of the at least one temperature detection element 13 increases. The processor 14 can calculate the temperature T of the heating element 12 according to the associated physical quantity x.

The at least one temperature detection element 13 can be arranged in an electronic cigarette. In at least one embodiment, the at least one temperature detection element 13 can be arranged to be adjacent to the heating element 12. The at least one temperature detection element 13 can be selected from one of a group comprising of a positive temperature coefficient (PTC) thermistor, a negative temperature coefficient (NTC) thermistor, a bimetallic strip, a thermocouple, a quartz crystal temperature sensor, an optical fiber temperature sensor, an infrared temperature sensor, a P-N junction temperature sensor, and any combination thereof. In at least one embodiment, the number of the temperature detection elements 13 can be one, or two, or more than two. If space allows, a number of temperature detection elements 13 of one kind and/or of different kinds can be arranged at different positions of the electronic cigarette. Thus, through the respective detected temperatures of the temperature detection elements 13, an average value of the temperature of the heating element 12 can be calculated. The average value of the temperature of the heating element 12 can more accurately reflect the actual temperature T of the heating element 12. When one of the temperature detection elements 13 is malfunctioning however, the processor 14 can timely determine and eliminate unreliable data, thereby the electronic cigarette temperature control system 100 can work normally with a higher temperature control accuracy.

The associated physical quantity x can be selected from one of a group consisting of a temperature t, a resistance, a voltage, a current, a resonant frequency, an optical power, and any combination thereof according to individual differences in the different detection elements of the at least one temperature detection element 13.

The processor 14 can determine the temperature t of the at least one temperature detection element 13 according to the associated physical quantity x of the at least one temperature detection element 13, and determine the temperature T of the heating element 12 according to the temperature t of the at least one temperature detection element 13. The processor 14 can further compare the temperature T of the heating element 12 with an upper threshold of the operating temperature $T_H$ and a lower threshold of the operating temperature $T_L$. An output voltage/an output power from the power supply 11 to the heating element 12 can be controlled accordingly. In at least one embodiment, the upper threshold of the operating temperature $T_H$ and the lower threshold of the operating temperature $T_L$ can be respectively the upper threshold of the operating temperature $T_H$ of the heating element 12 and the lower threshold of the operating temperature $T_L$ of the heating element 12. Temperatures $T_H$ and $T_L$ can also be the upper threshold of the operating temperature $T_H$ of the electronic cigarette temperature control system and the lower threshold of the operating temperature $T_L$ of the electronic cigarette temperature control system, or the upper threshold of the operating temperature $T_H$ of the electronic cigarette and the lower threshold of the operating temperature $T_L$ of the electronic cigarette.

Figure 2:
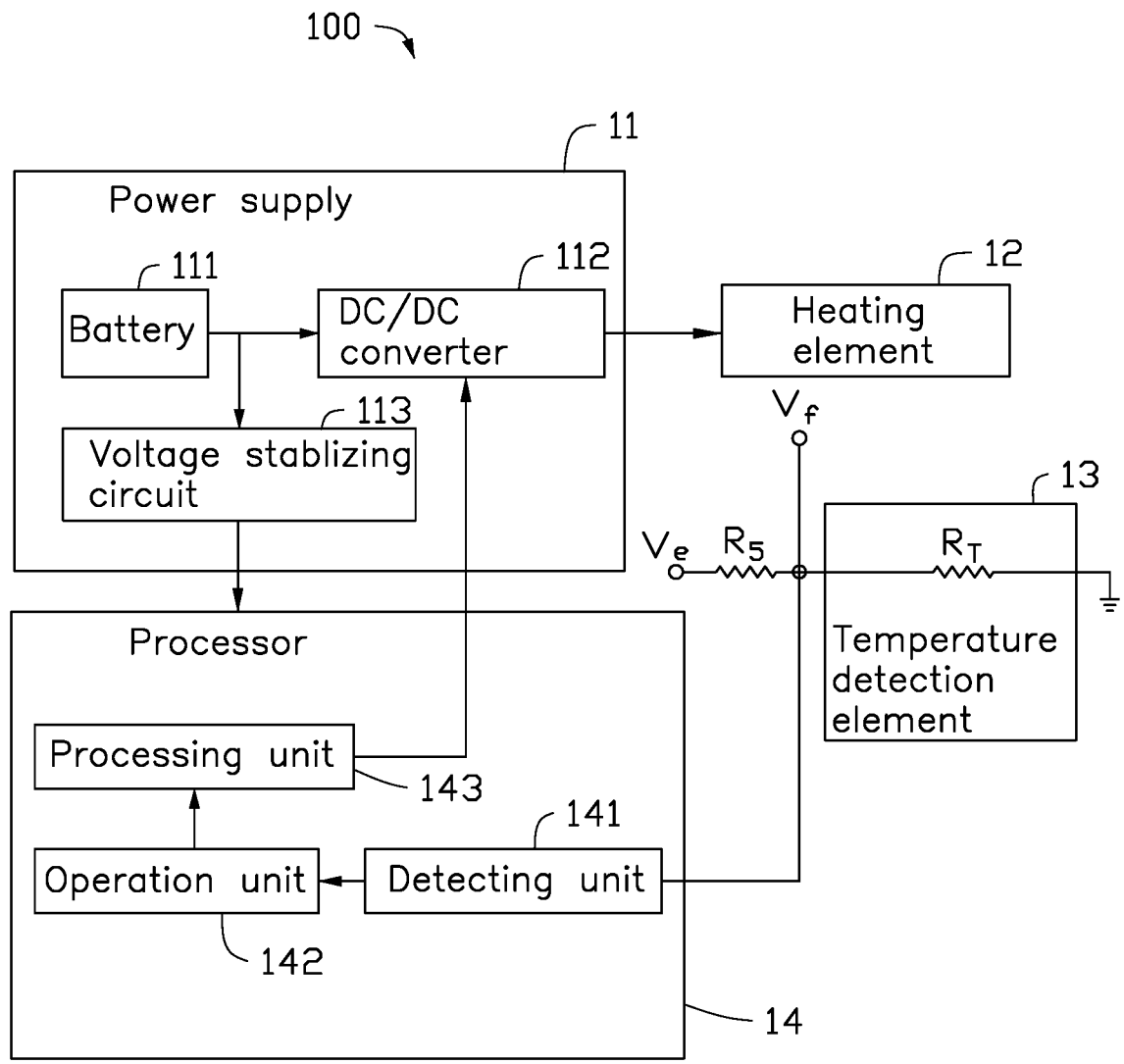
FIG. 2 illustrates a more detailed circuit schematic diagram of the first embodiment of the electronic cigarette temperature control system.

Referring also to FIG. 2, in at least one embodiment, each temperature detection element 13 can be a PTC thermistor. The temperature t of the at least one temperature detection element 13 can increase when the temperature T of the heating element 12 increases. The resistance value $R_T$ of the at least one temperature detection element 13 can increase with the increasing of temperature t of the at least one temperature detection element 13. In at least one embodiment, the associated physical quantity x of each temperature detection element 13 can be a resistance value $R_T$.

In at least one embodiment, in order for convenient measurement of the resistance value $R_T$ of the at least one temperature detection element 13, the at least one temperature detection element 13 can be coupled with a fixed resistor $R_5$ in series. A voltage drop across the fixed resistor $R_5$ can be $(V_e-V_f)$. Thus, a current flowing through the fixed resistor $R_5$ can be $(V_e-V_f)/R_5$. A voltage drop across the at least one temperature detection element 13 can be $V_f$, thus the resistance value $R_T$ of the at least one temperature detection element 13 can be expressed by $R_T=R_5*V_f/(V_e-V_f)$.

In detail, the processor 14 can include a detecting unit 141, an operation unit 142, and a processing unit 143 coupled in sequence. The detecting unit 141 can be electrically coupled to the at least one temperature detection element 13. The detecting unit 141 can be configured to detect the voltage drop $V_f$ across the at least one temperature detection element 13, and output the voltage drop $V_f$ to the operation unit 142. The operation unit 142 can pre-store a first formula, a relationship between the resistance value $R_T$ of the at least one temperature detection element 13 and the temperature t of the at least one temperature detection element 13, and a second formula. The first formula can be $R_T=R_5*V_f/(V_e-V_f)$, where $R_T$ can be the resistance value of the at least one temperature detection element 13, $R_5$ can be the resistance value of the fixed resistor $R_5$, $V_f$ can be the voltage drop across the at least one temperature detection element, and $(V_e-V_f)$ can be the voltage drop across the fixed resistor $R_5$. The second formula can be $T=t+\Delta t$, where T can be the temperature of the heating element 12, t can be the temperature of the at least one temperature detection element 13, and $\Delta t$ can be an experimental data presenting the difference between the temperature of the heating element 12 and the temperature of the at least one temperature detection element 13. The operation unit 142 can calculate the resistance value $R_T$ of the at least one temperature detection element 13 according to the first formula $R_T=R_5*V_f/(V_e-V_f)$, and calculate the temperature t of the at least one temperature detection element 13 according to the relationship between the resistance value $R_T$ of the at least one temperature detection element 13 and the temperature t of the at least one temperature detection element 13. The operation unit 142 can further calculate the temperature T of the heating element 12 according to the second formula $T=t+\Delta t$, and output the temperature T of the heating element 12 to the processing unit 143. The processing unit 143 can compare the temperature T of the heating element 12 with the pre-stored upper threshold of the operating temperature $T_H$ and the lower threshold of the operating temperature $T_L$, and control the output voltage/the output power from the power supply 11 to the heating element 12 accordingly.

In at least one embodiment, the power supply 11 can include a battery 111, a DC/DC converter 112, and a voltage-stabilizing circuit 113. The battery 111 can be electrically coupled to the DC/DC converter 112 and the steady voltage circuit 113. The battery 111 can be charged with sufficient energy to power the DC/DC converter 112 and the voltage-stabilizing circuit 113. The DC/DC converter 112 can be electrically coupled to the heating element 12. The DC/DC converter 112 can boost a voltage from the battery 111 to the heating element 12. The voltage-stabilizing circuit 113 can be electrically coupled to the processor 14. The voltage-stabilizing circuit 113 can output a constant voltage $V_e$ to the processor 14. In at least one embodiment, the battery 111 can be a lithium-ion battery. It will be appreciated that, in other embodiments, the DC/DC converter 112 and the voltage-stabilizing circuit 113 can be omitted, or be replaced by other circuits.

Figure 3:
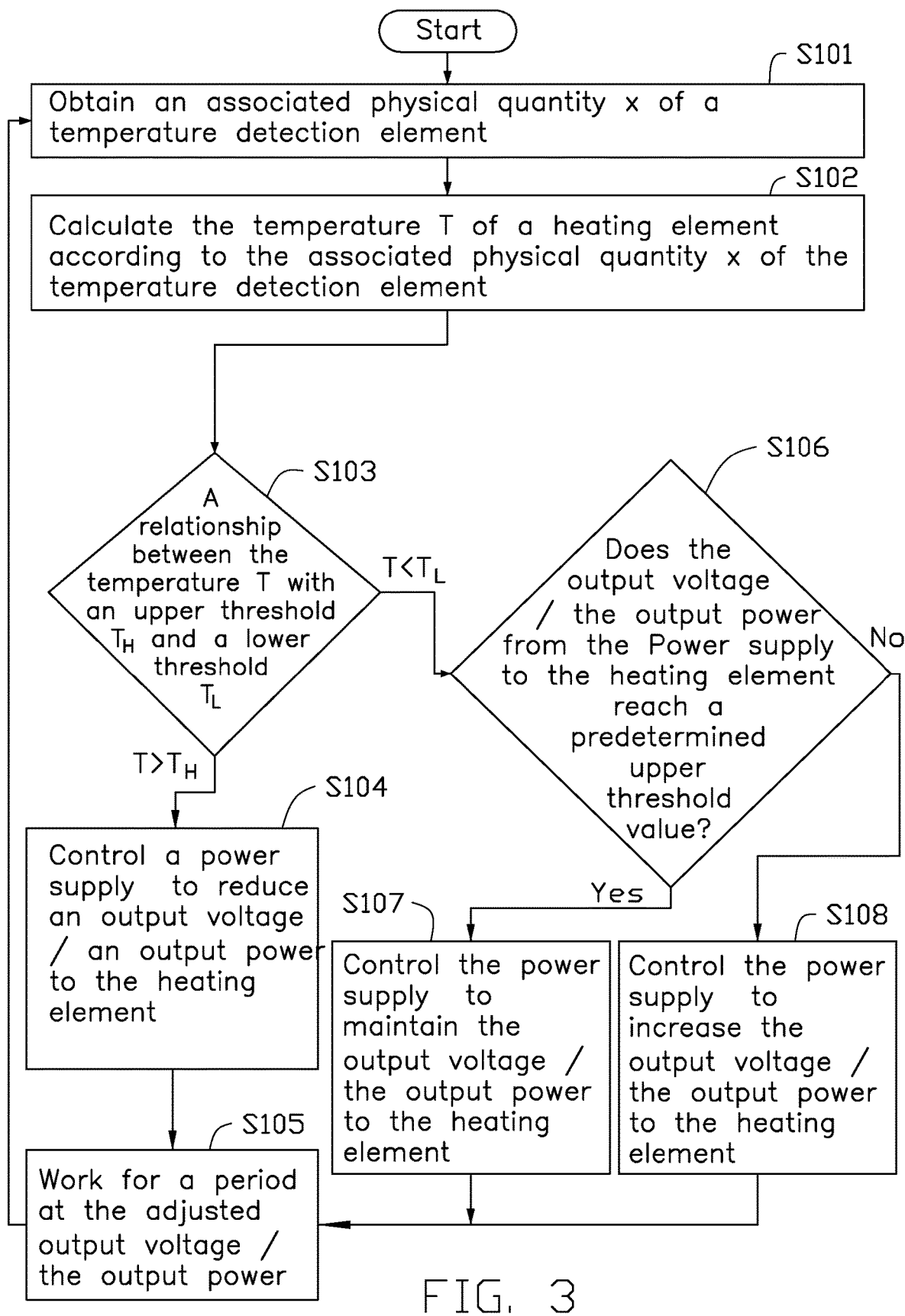
FIG. 3 illustrates a flowchart of a first embodiment of the electronic cigarette temperature control method.

Referring to FIG. 3, a flowchart of the electronic cigarette temperature control method is shown. The electronic cigarette temperature control method described below can be carried out using the configurations of the electronic cigarette temperature control system illustrated in FIG. 1, for example, and various elements of these figures are referenced in the explanation of method. The electronic cigarette temperature control method includes the following steps:

At step 101, the processor 14 can obtain the associated physical quantity x of the at least one temperature detection element 13. Then the procedure goes to step 102.

At step 102, the processor 14 can calculate the temperature T of the heating element 12 according to the associated physical quantity x of the at least one temperature detection element 13. Then the procedure goes to step 103.

At step 103, the processor 14 can compare the temperature T of the heating element 12 with the upper threshold of the operating temperature $T_H$ and the lower threshold of the operating temperature $T_L$. If the temperature T of the heating element 12 is greater than the upper threshold of the operating temperature $T_H$, the procedure goes to step 104. If the temperature T of the heating element 12 is less than the lower threshold of the operating temperature $T_L$, the procedure goes to step 106.

At step 104, the processor 14 can control the power supply 11 to reduce the output voltage/the output power to the heating element 12. Then the procedure goes to step 105.

At step 105, the heating element 12 can work for a period at the adjusted output voltage/the adjusted output power. Then, the procedure goes to step 101, and repeats the subsequent processing. In at least one embodiment, the period can be one second, two seconds, five seconds or the like.

At step 106, the processor 14 can determine whether the output voltage/the output power from the power supply 11 to the heating element 12 reaches a predetermined upper threshold value. If the output voltage/the output power from the power supply 11 to the heating element 12 reaches the predetermined upper threshold value, the procedure goes to step 107. If the output voltage/the output power from the power supply 11 to the heating element 12 has not yet reached the predetermined upper threshold value, the procedure goes to step 108.

At step 107, the processor 14 can control the power supply 11 to maintain the output voltage/the output power to the heating element 12. Then the procedure goes to step 105.

At step 108, the processor 14 can control the power supply 11 to increase the output voltage/the output power to the heating element 12. Then the procedure goes to step 105.

In other embodiments, the electronic cigarette temperature control system can further include a display. The display can be configured to display information about work state of the electronic cigarette, such as, a temperature T of the heating element, a battery power, a work voltage, an output power, or the like.

Figure 4:
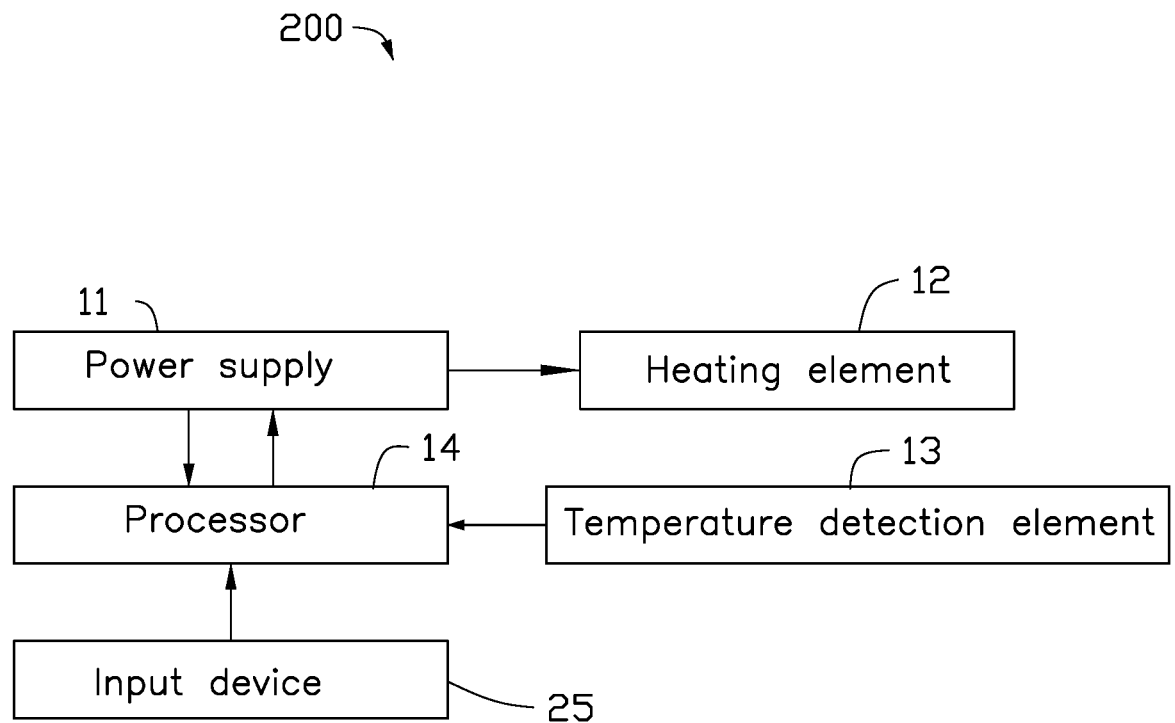
FIG. 4 illustrates a circuit schematic diagram of a second embodiment of the electronic cigarette temperature control system.

FIG. 4 illustrates a second embodiment of the electronic cigarette temperature control system 200. The electronic cigarette temperature control system 200 of the second embodiment can be similar to the electronic cigarette temperature control system 100 of the first embodiment, except that:

The electronic cigarette temperature control system 200 can further include an input device 25. The input device 25 can be electrically coupled to the processor 14. The user can input a desired target temperature $T_D$ via the input device 25. The desired target temperature $T_D$ is greater than or equal to the lower threshold of the operating temperature $T_L$ and is less than or equal to the upper threshold of the operating temperature $T_H$. The heating element 12 can be maintained to work at a temperature $T_D \pm \Delta t'$. Where $\Delta t'$ represents a temperature deviation generated by a certain lag of a response time of the power supply 11, the heating element 12, the at least one temperature detection element 13, and the processor 14.

Figure 5:
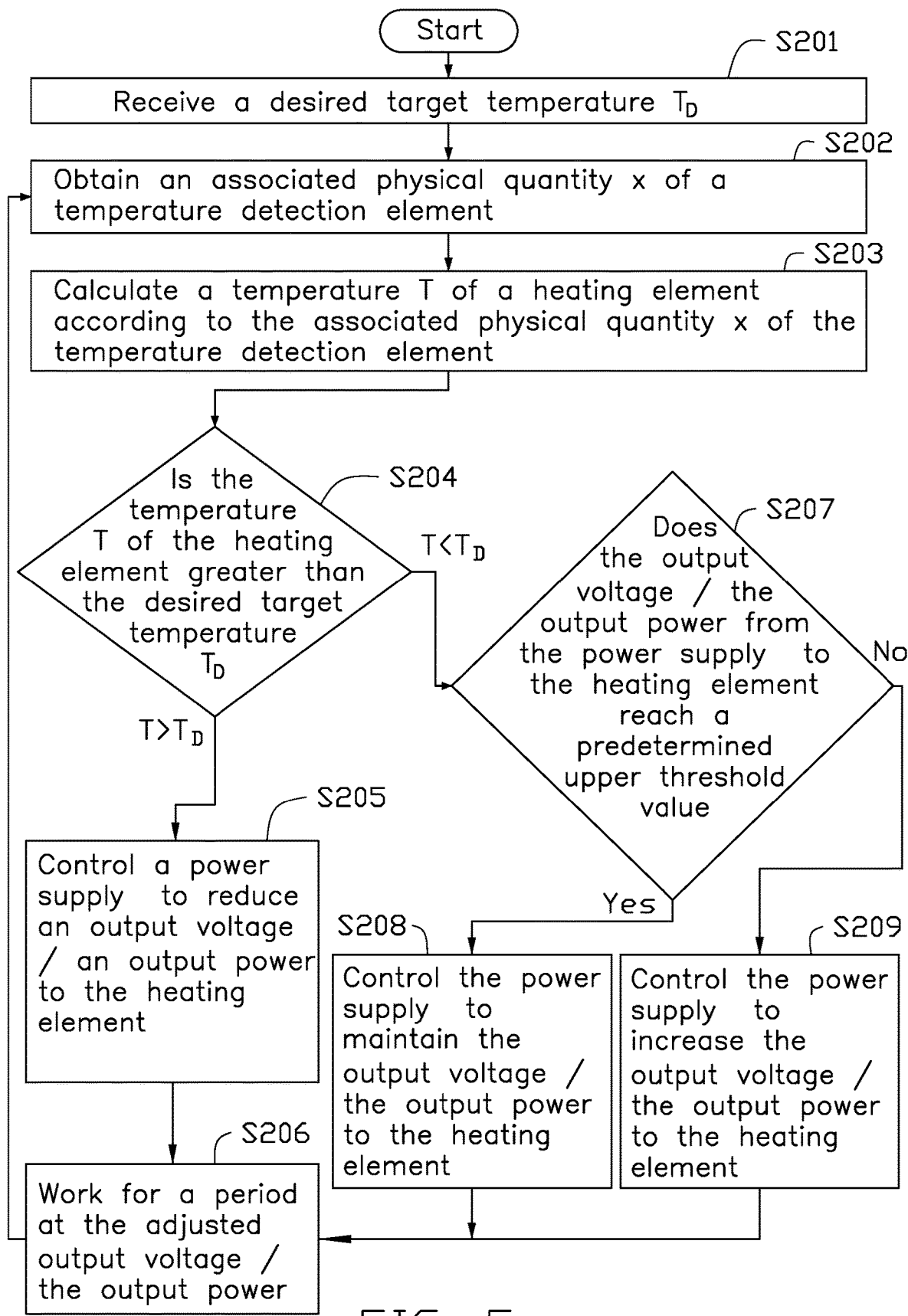
FIG. 5 illustrates a flowchart of a second embodiment of the electronic cigarette temperature control method.

Referring to FIG. 5, a flowchart of the electronic cigarette temperature control method is shown. The electronic cigarette temperature control method described below can be carried out using the configurations of the electronic cigarette temperature control system 200 illustrated in FIG. 4, for example, and various elements of these figures are referenced in the explanation of method. The electronic cigarette temperature control method includes the following steps:

At step 201, the processor 14 can receive a desired target temperature $T_D$ inputted from the user via the input device 25. Then the procedure goes to step 202.

At step 202, the processor 14 can obtain the associated physical quantity x of the at least one temperature detection element 13. Then the procedure goes to step 203.

At step 203, the processor 14 can calculate the temperature T of the heating element 12 according to the associated physical quantity x of the at least one temperature detection element 13. Then the procedure goes to step 204.

At step 204, the processor 14 can compare the temperature T of the heating element 12 with the desired target temperature $T_D$. If the temperature T of the heating element 12 is greater than the desired target temperature $T_D$, the procedure goes to step 205. If the temperature T of the heating element 12 is less than the desired target temperature $T_D$, the procedure goes to step 207.

At step 205, the processor 14 can control the power supply 11 to reduce the output voltage/the output power to the heating element 12. Then the procedure goes to step 206.

At step 206, the heating element 12 can work for a period at the adjusted output voltage/the adjusted output power. In at least one embodiment, the period can be one second, two seconds, five seconds or the like. Then, in at least one embodiment, the procedure goes to step 202, and repeats the subsequent processing. In other embodiments, the procedure goes to step 201, and repeats the subsequent processing.

At step 207, the processor 14 can determine whether the output voltage/the output power from the power supply 11 to the heating element 12 reaches the predetermined upper threshold value. If the output voltage/the output power from the power supply 11 to the heating element 12 reaches the predetermined upper threshold value, the procedure goes to step 208. If the output voltage/the output power from the power supply 11 to the heating element 12 has not yet reached the predetermined upper threshold value, the procedure goes to step 209.

At step 208, the processor 14 can control the power supply 11 to maintain the output voltage/the output power to the heating element 12. Then the procedure goes to step 206.

At step 209, the processor 14 can control the power supply 11 to increase the output voltage/the output power to the heating element 12. Then the procedure goes to step 206.

In other embodiments, if the processor 14 detects that no desired target temperature $T_D$ is inputted from the user, the steps of the electronic cigarette temperature control method of the second embodiment can be the same as the electronic cigarette temperature control method of the first embodiment.

In other embodiments, the electronic cigarette temperature control system 200 can further include a display. The display can be configured to display information about work state of the electronic cigarette, such as, a temperature T of the heating element, a battery power, a work voltage, an output power, or the like.

Figure 6:
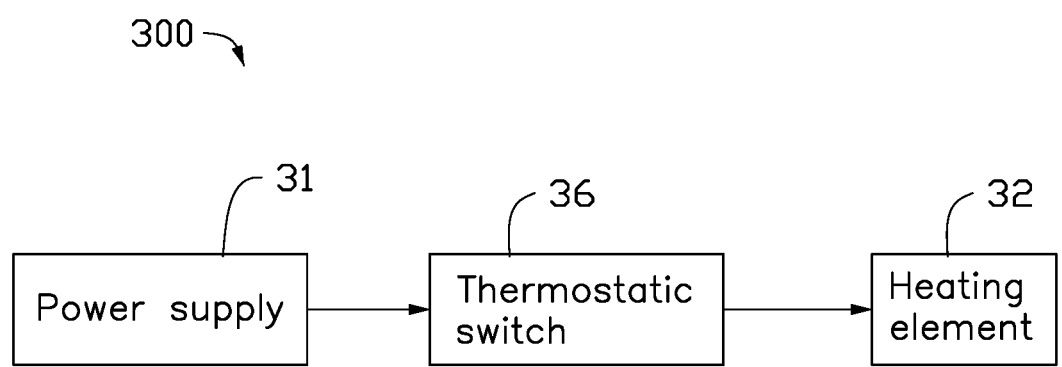
FIG. 6 illustrates a circuit schematic diagram of a third embodiment of the electronic cigarette temperature control system.

FIG. 6 illustrates a third embodiment of the electronic cigarette temperature control system 300. The electronic cigarette temperature control system 300 can include a power supply 31, a thermostatic switch 36, and a heating element 32 coupled in sequence. The heating element 32 can heat smoke liquid, wax, or tobacco, causing a user to experience a simulation of tobacco smoking after the power supply 31 supplies power to the heating element 32.

The thermostatic switch 36 can turn on a connection between the power supply 31 and the heating element 32 or turn off the connection between the power supply 31 and the heating element 32 in the role of temperature. The temperature $t_s$ of the thermostatic switch 36 can increase when the temperature T of the heating element 32 increases. When the temperature $t_s$ of the thermostatic switch 36 is less than a switch temperature $T_M$ of the thermostatic switch 36, the thermostatic switch 36 can turn on the connection between the power supply 31 and the heating element 32. The heating element 32 can work normally. Thus, the temperature T of the heating element 32 can increase and the temperature $t_s$ of the thermostatic switch 36 can increase accordingly. When the temperature $t_s$ of the thermostatic switch 36 is greater than the switch temperature $T_M$ of the thermostatic switch 36, the thermostatic switch 36 can turn off the connection between the power supply 31 and the heating element 32. The heating element 32 can stop working. Thus, the temperature T of the heating element 32 can naturally decrease and the temperature $t_s$ of the thermostatic switch 36 can decrease accordingly until that the temperature $t_s$ of the thermostatic switch 36 is less than the switch temperature $T_M$ of the thermostatic switch 36. When the temperature $t_s$ of the thermostatic switch 36 is less than the switch temperature $T_M$ of the thermostatic switch 36, the thermostatic switch 36 can turn on the connection between the power supply 31 and the heating element 32 again, thus the heating element 32 can work normally again.

The thermostatic switch 36 can be arranged in the electronic cigarette. In at least one embodiment, the thermostatic switch 36 can be arranged to be adjacent to the heating element 32. Considering that the temperature $t_s$ of the thermostatic switch 36 is slightly less than the temperature T of the heating element 32, in at least one embodiment, the switching temperature $T_M$ of the thermostatic switch 36 is slightly less than the upper threshold of the operating temperature $T_H$. In at least one embodiment, the thermostatic switch 36 can be selected from one of a group consisting of a mechanical thermostat switch, an electronic thermostat switch, a temperature relay, and any combination thereof. The mechanical thermostat switch can be a vapor pressure thermostat switch, a liquid expansion thermostat switch, a gas adsorption thermostat switch, or a metal expansion thermostat switch. The metal expansion thermostat switch can be a bimetal switch or a memory alloy actuated heat switch. The electronic thermostat switch can be a resistance thermostat switch or a thermocouple thermostat switch. The temperature relay can be a thermal reed relay.

In other embodiments, the electronic cigarette temperature control system 300 can further include a display. The display can be configured to display information about work state of the electronic cigarette, such as, a temperature T of the heating element, a battery power, a work voltage, an output power, or the like.

Figure 7:
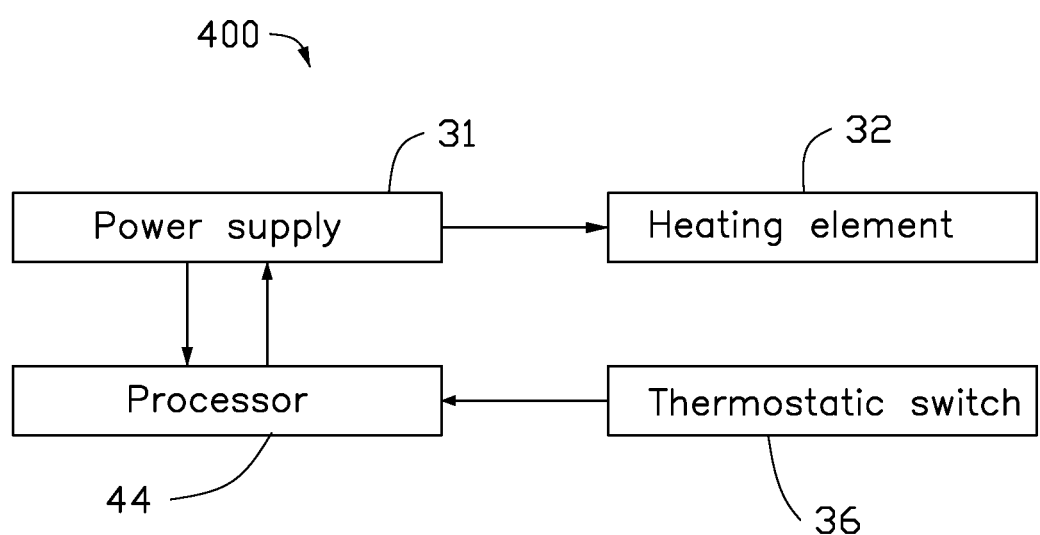
FIG. 7 illustrates a circuit schematic diagram of a fourth embodiment of the electronic cigarette temperature control system.

FIG. 7 illustrates a fourth embodiment of the electronic cigarette temperature control system 400. The electronic cigarette temperature control system 400 of the fourth embodiment can be similar to the electronic cigarette temperature control system 300 of the third embodiment, except that:

In the fourth embodiment, the electronic cigarette temperature control system 400 can include a processor 44. The thermostatic switch 36 can be electrically coupled to the processor 44. The thermostatic switch 36 cannot control the connection between the power supply 31 and the heating element 32 directly. The processor 44 can control the output voltage/the output power from the power supply 31 to the heating element 32 after the processor 44 judges according to an on or off state of the thermostatic switch 36.

The temperature $t_s$ of the thermostatic switch 36 can increase when the temperature T of the heating element 32 increases. When the temperature $t_s$ of the thermostatic switch 36 is less than a switch temperature $T_M$ of the thermostatic switch 36, the thermostatic switch 36 can perform action A. When the temperature $t_s$ of the thermostatic switch 36 is greater than a switch temperature $T_M$ of the thermostatic switch 36, the thermostatic switch 36 can perform action B. The processor 44 can detect the action of the thermostatic switch 36, and control the output voltage/the output power from the power supply 41 to the heating element 32 according to the different action of the thermostatic switch 36. The action A can be the thermostatic switch 36 turn on and the action B can be the thermostatic switch 36 turn off. In other embodiments, the action A can be the thermostatic switch 36 turn off and the action B can be the thermostatic switch 36 turn on.

The electronic cigarette temperature control system 400 has the following beneficial effects:

The electronic cigarette temperature control system 400 can employ the following thermostatic switch 36: the thermostatic switch 36 can turn on when the temperature $t_s$ of the thermostatic switch 36 is less than the switch temperature $T_M$ of the thermostatic switch 36, the thermostatic switch 36 can turn off when the temperature $t_s$ of the thermostatic switch 36 is greater than the switch temperature $T_M$ of the thermostatic switch 36. Or the thermostatic switch 36 can turn off when the temperature $t_s$ of the thermostatic switch 36 is less than the switch temperature $T_M$ of the thermostatic switch 36, the thermostatic switch 36 can turn on when the temperature $t_s$ of the thermostatic switch 36 is greater than the switch temperature $T_M$ of the thermostatic switch 36.

The processor 44 can adjust the output voltage/the output power from the power supply 31, thus the fluctuation of the temperature T is small, thereby helping to maintain a good taste. Thus, the heating element 32 can avoid immediately stopping working when the temperature of the heating element 32 is too high, thereby avoiding the temperature T of the heating element 32 falling too fast and avoiding effecting the experience of the user.

Figure 8:
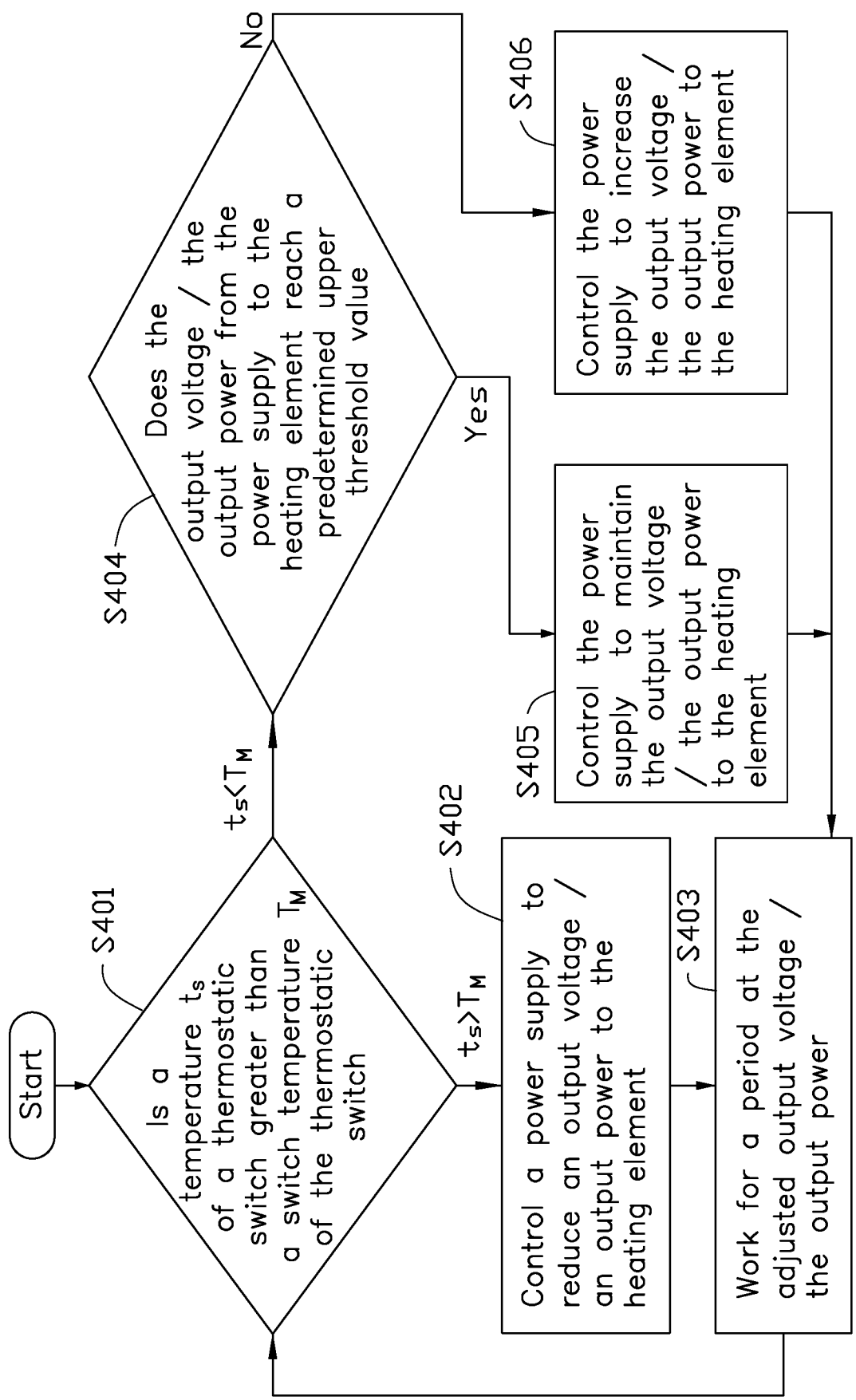
FIG. 8 illustrates a flowchart of a fourth embodiment of the electronic cigarette temperature control method.

Referring to FIG. 8, a flowchart of the electronic cigarette temperature control method is shown. The electronic cigarette temperature control method described below can be carried out using the configurations of the electronic cigarette temperature control system 400 illustrated in FIG. 7, for example, and various elements of these figures are referenced in the explanation of method. The electronic cigarette temperature control method includes the following steps:

At step 401, the processor 44 can determine a relationship between the temperature $t_s$ of the thermostatic switch 36 and a switch temperature $T_M$ of the thermostatic switch 36 according to the action of the thermostatic switch 36. When the temperature $t_s$ of the thermostatic switch 36 is greater than a switch temperature $T_M$ of the thermostatic switch 36, the procedure goes to step 402. When the temperature $t_s$ of the thermostatic switch 36 is less than the switch temperature $T_M$ of the thermostatic switch 36, the procedure goes to step 404.

At step 402, the processor 44 can control the power supply 31 to reduce the output voltage/the output power to the heating element 32. Then the procedure goes to step 403.

At step 403, the heating element 32 can work for a period at the adjusted output voltage/the adjusted output power. Then, the procedure goes to step 401, and repeats the subsequent processing. In at least one embodiment, the period can be one second, two seconds, five seconds or the like.

At step 404, the processor 44 can determine whether the output voltage/the output power from the power supply 31 to the heating element 32 reaches a predetermined upper threshold value. If the output voltage/the output power from the power supply 31 to the heating element 32 reaches the predetermined upper threshold value, the procedure goes to step 405. If the output voltage/the output power from the power supply 31 to the heating element 32 doesn't reach the predetermined upper threshold value, the procedure goes to step 406.

At step 405, the processor 44 can control the power supply 31 to maintain the output voltage/the output power to the heating element 32. Then the procedure goes to step 403.

At step 406, the processor 44 can control the power supply 31 to increase the output voltage/the output power to the heating element 32. Then the procedure goes to step 403.

In other embodiments, the electronic cigarette temperature control system 400 can further include a display. The display can be configured to display information about work state of the electronic cigarette, such as, a temperature T of the heating element, a battery power, a work voltage, an output power, or the like.

Figure 9:
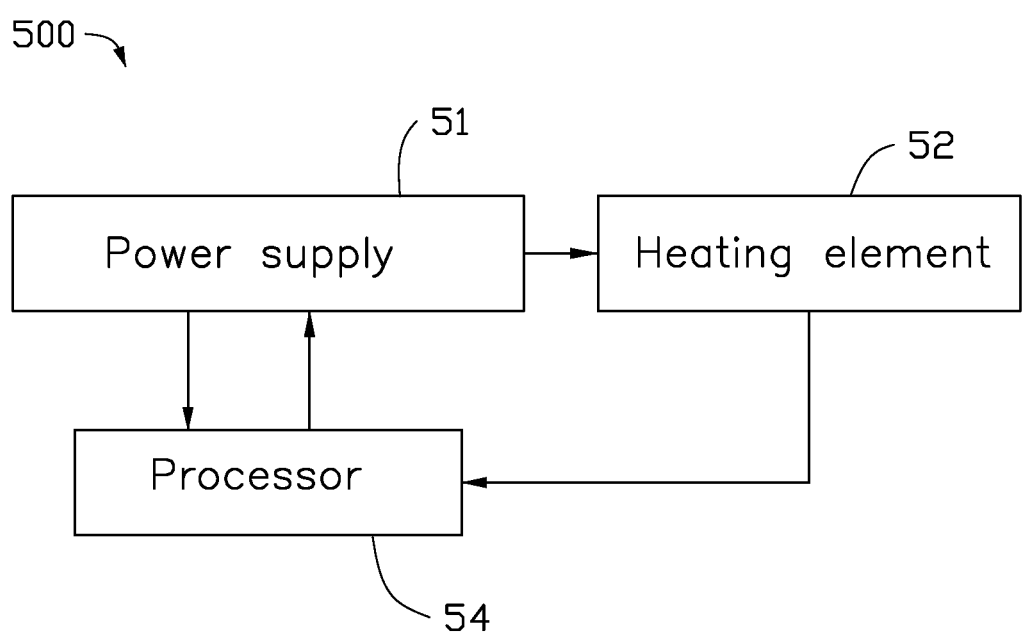
FIG. 9 illustrates a circuit schematic diagram of a fifth embodiment of the electronic cigarette temperature control system.

FIG. 9 illustrates a fifth embodiment of the electronic cigarette temperature control system 500. The electronic cigarette temperature control system 500 can include a power supply 51, a heating element 52, and a processor 54. The power supply 51 can be electrically coupled to the heating element 52 and the processor 54. The heating element 52 can be electrically coupled to the processor 54. The heating element 52 can heat smoke liquid, wax, or tobacco, causing a user to experience a simulation of tobacco smoking after the power supply 51 supplies power to the heating element 52.

The heating element 52 can act as the heating element and the temperature detection element. The heating element 52 has temperature coefficient of resistance characteristics wherein the resistance value $R_L$ increases with the increasing of the temperature T and changes by a certain proportion. The heating element 52 can be made of material selected from one of a group consisting of platinum, copper, nickel, titanium, iron, ceramic-based PTC materials, polymer-based PTC materials, and any combination thereof.

The processor 54 can pre-store an upper threshold of the operating temperature $T_H$, a lower threshold of the operating temperature $T_L$, and a relationship between the resistance value $R_L$ of the heating element 52 and the temperature T of the heating element 52. The processor 54 can determine the temperature T of the heating element 52 according to the resistance value $R_L$ of the heating element 52. The processor 54 can further compare the temperature T of the heating element 52 with the upper threshold of the operating temperature $T_H$ and the lower threshold of the operating temperature $T_L$, and control the output voltage/the output power from the power supply 51 to the heating element 52 accordingly.

Figure 10:
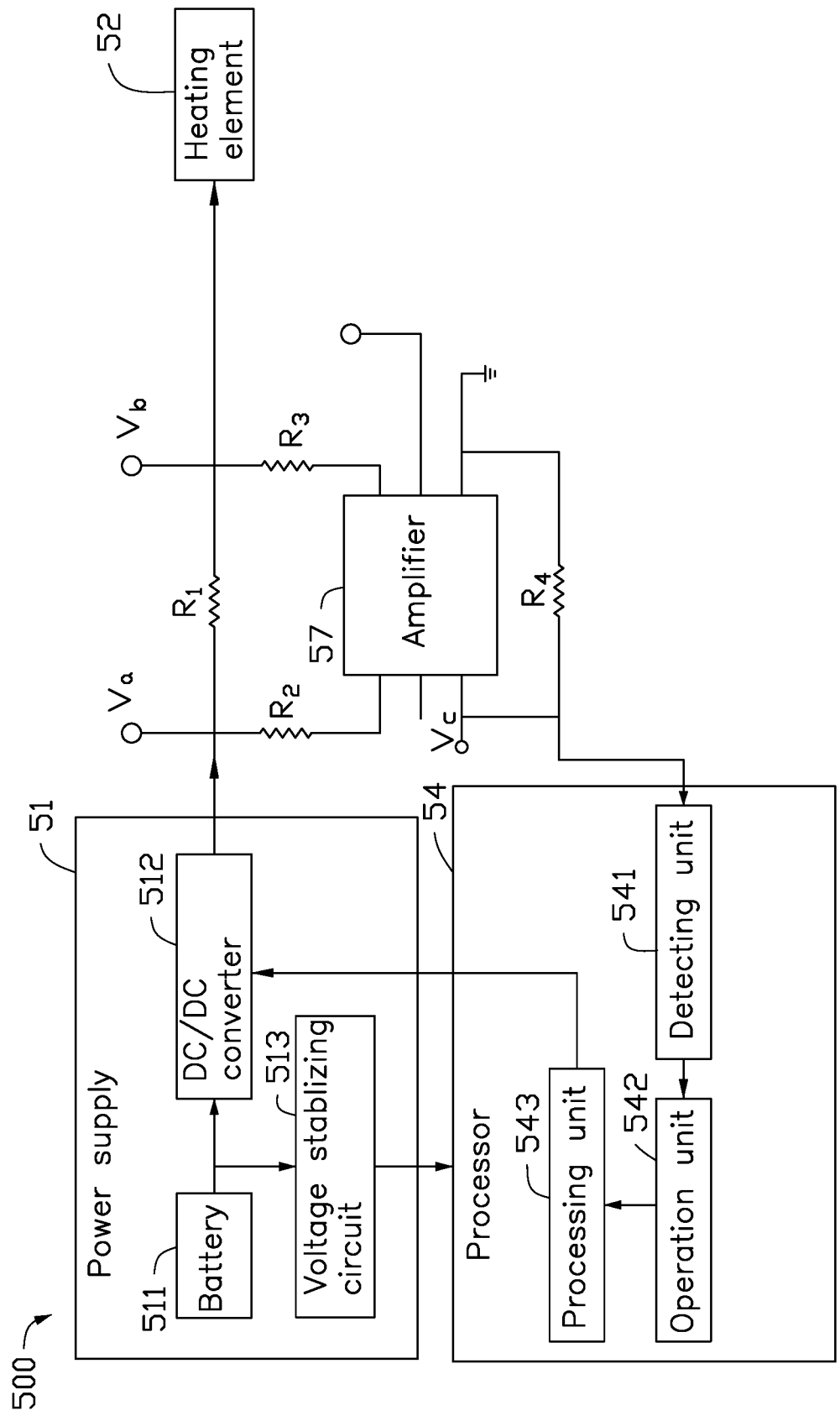
FIG. 10 illustrates a more detailed circuit schematic diagram of the fifth embodiment of the electronic cigarette temperature control system.

Referring to FIG. 10, in detail, the power supply 51 can include a battery 511, a DC/DC converter 512, and a voltage-stabilizing circuit 513. The battery 511 can be electrically coupled to the DC/DC converter 512 and the voltage-stabilizing circuit 513. The battery 511 can be charged with sufficient energy to power the DC/DC converter 512 and the voltage-stabilizing circuit 513. The DC/DC converter 512 can be electrically coupled to the heating element 52. The DC/DC converter 512 can boost the voltage from the battery 511 to the heating element 52. The voltage-stabilizing circuit 513 can be electrically coupled to the processor 54. The voltage-stabilizing circuit 513 can output a constant voltage to the processor 54. In at least one embodiment, the battery 511 can be a lithium-ion battery. It will be appreciated that, in other embodiments, the DC/DC converter 512 and the voltage-stabilizing circuit 513 can be omitted, or be replaced by other circuits.

In at least one embodiment, the electronic cigarette temperature control system 500 can further include a first fixed resistor $R_1$. The first fixed resistor $R_1$ can be arranged between the power supply 51 and the heating element 52. The first fixed resistor $R_1$ can be configured to auxiliary calculate the resistance value $R_L$ of the heating element 52. In at least one embodiment, the first fixed resistor $R_1$ can be arranged between the DC/DC converter 512 and the heating element 52. The DC/DC converter 512 can be controlled by the processor 54 to provide a constant voltage $V_a$ to the first fixed resistor $R_1$ and the heating element 52. The voltage drops across the heating element 52 can be $V_b$. Thus, the current flowing through the heating element 52 can be $(V_a-V_b)/R_1$, and the resistance value $R_L$ of the heating element 52 can be $R_1*V_b/(V_a-V_b)$.

In at least one embodiment, when the resistance value of the first fixed resistor $R_1$ is small, the voltage drop $(V_a-V_b)$ across the first fixed resistor $R_1$ can be according small and can be difficult to measure. If the resistance value of the first fixed resistor $R_1$ is increased, the voltage drop $V_b$ across the heating element 52 can be reduced, thus the output power from the heating element 52 can be reduced. For conveniently measuring the voltage drop $(V_a-V_b)$ across the first fixed resistor $R_1$, the electronic cigarette temperature control system 500 can further include a second fixed resistor $R_2$, an amplifier 57, a third fixed resistor $R_3$, and a fourth fixed resistor $R_4$. The first fixed resistor $R_1$ can be coupled in parallel to a series connection of the second fixed resistor $R_2$, the amplifier 57, the third fixed resistor $R_3$. The fourth fixed resistor $R_4$ can be coupled with the amplifier 57 in parallel. The voltage drops across the first fixed resistor $R_1$ can be $(V_a-V_b)=V_c*R_2/R_4$ based to characteristic parameter of the amplifier 57. In at least one embodiment, the amplifier 57 can be a LT6105 chip. It will be appreciated that, the connection between the second fixed resistor $R_2$, the third fixed resistor $R_3$, and the fourth fixed resistor $R_4$ can be different according to the different amplifier 57, at least one of the second fixed resistor $R_2$, the third fixed resistor $R_3$, and the fourth fixed resistor $R_4$ may be omitted, or other electronic components may be added.

In detail, the processor 54 can include a detecting unit 541, an operation unit 542, and a processing unit 543 coupled in sequence. The detecting unit 541 can be electrically coupled to the fourth fixed resistor $R_4$. The detecting unit 541 can be configured to detect the voltage drop $V_c$ across the fourth fixed resistor $R_4$ and output the voltage drop $V_c$ to the operation unit 542. The operation unit 542 can pre-store a third formula, a fourth formula, and a relationship between the resistance value $R_L$ of the heating element 52 and the temperature T of the heating element 52. The third formula can be $(V_a-V_b)=V_c*R_2/R_4$. Where, $(V_a-V_b)$ can be a voltage drop across the first fixed resistor $R_1$, $V_c$ can be the voltage drop across the fourth fixed resistor $R_4$, $R_2$ can be a resistance value of the second fixed resistor $R_2$, and $R_4$ can be a resistance value of the fourth fixed resistor $R_4$. The fourth formula can be $R_L=R_1*V_b/(V_a-V_b)$. Where, $R_L$ can be a resistance value of the heating element 52, $R_1$ can be a resistance value of the first fixed resistor $R_1$, $V_b$ can be the voltage drop across the heating element 52, and $(V_a-V_b)$ can be a voltage drop across the first fixed resistor $R_1$. The operation unit 542 can calculate the voltage drop $(V_a-V_b)$ across the first fixed resistor $R_1$ according to the third formula based on characteristic parameter of the amplifier 57, and calculate the resistance value $R_L$ of the heating element 52 according to the fourth formula. The operation unit 542 can further determine the temperature T of the heating element 52 according to the pre-stored relationship between the resistance value $R_L$ of the heating element 52 and the temperature T of the heating element 52, and output the temperature T of the heating element 52 to the processing unit 543. The processing unit 543 can compare the temperature T of the heating element 52 with the pre-store upper threshold of the operating temperature $T_H$ and the lower threshold of the operating temperature $T_L$, and control the output voltage/the output power from the DC/DC converter 512 to the heating element 52 accordingly.

Figure 11:
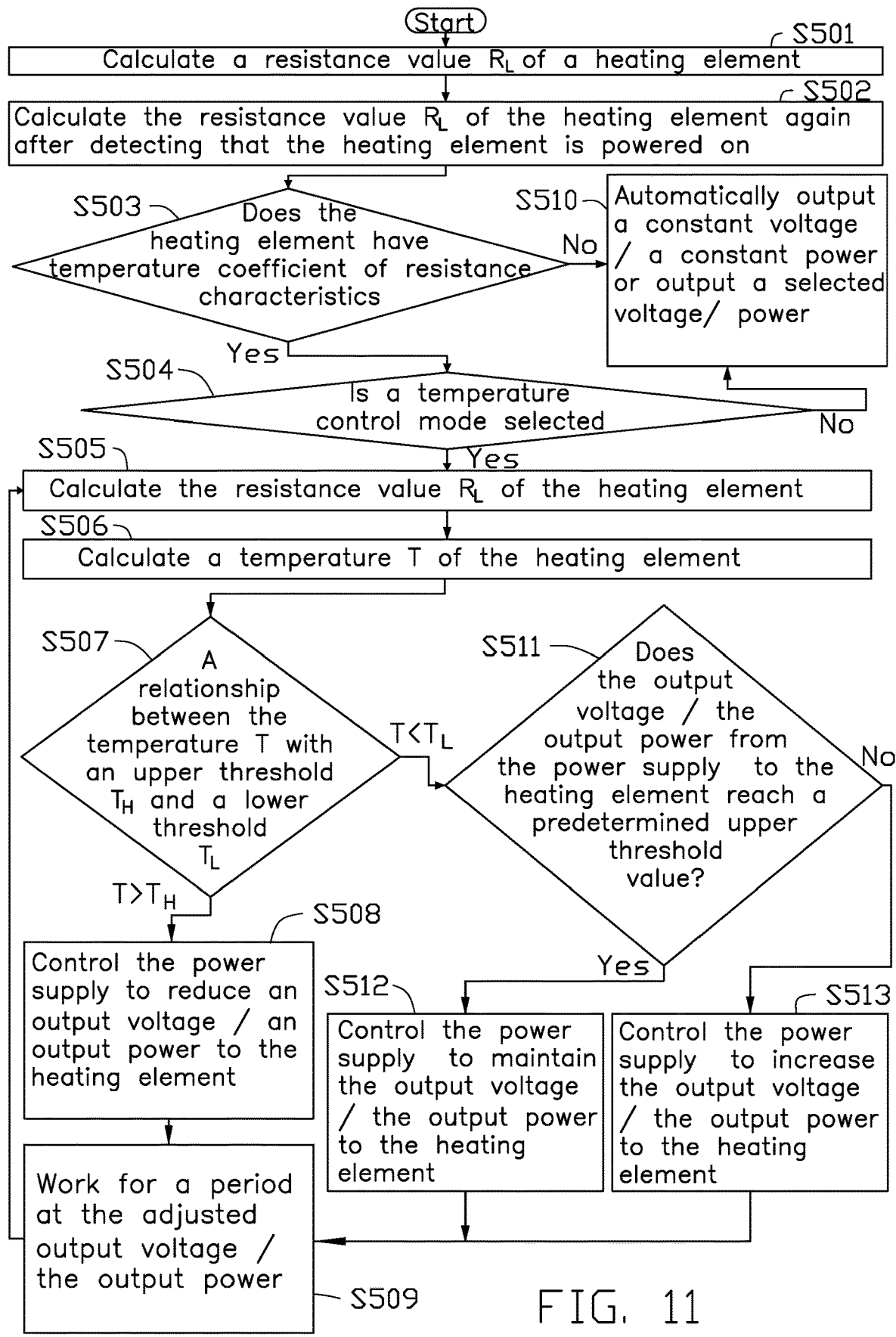
FIG. 11 illustrates a flowchart of an embodiment of a fifth embodiment of the electronic cigarette temperature control method.

Referring to FIG. 11, a flowchart of the electronic cigarette temperature control method is shown. The electronic cigarette temperature control method described below can be carried out using the configurations of the electronic cigarette temperature control system 500 illustrated in FIG. 9, for example, and various elements of these figures are referenced in the explanation of method. The electronic cigarette temperature control method includes the following steps:

At step 501, the processor 54 can calculate the resistance value $R_L$ of the heating element 52 before the heating element 52 is powered on. Then the procedure goes to step 502.

At step 502, the processor 54 can calculate the resistance value $R_L$ of the heating element 52 again after the processor 54 detects that the heating element 52 is powered on. Then the procedure goes to step 503. In at least one embodiment, when the processor 54 detects that a button or a pressure sensor is activated, the processor 54 detects that the heating element 52 is powered on. In at least one embodiment, when the user pushes the button, or (in some variations) activates a pressure sensor by inhaling, or the like, the processor 54 detects that the button or the pressure sensor is activated.

At step 503, the processor 54 can determine whether the heating element 52 has temperature coefficient of resistance characteristics according to the resistance value $R_L$ calculated at step 501 and the resistance value $R_L$ calculated at step 502. If a difference between the resistance value $R_L$ calculated at step 501 and the resistance value $R_L$ calculated at step 502 is out of a preset range, the heating element 52 can have temperature coefficient of resistance characteristics, the procedure goes to step 504. If the difference between the resistance value $R_L$ calculated at step 501 and the resistance value $R_L$ calculated at step 502 is no significant or is in the preset range, the heating element 52 doesn't have temperature coefficient of resistance characteristics, the procedure goes to step 510.

At step 504, the processor 54 can determine whether a temperature control mode is selected. In at least one embodiment, the electronic cigarette may provide a switch for the user to operate. The processor 54 can determine that the temperature control mode is selected when the processor 54 detects that the switch is on. The processor 54 can determine that the temperature control mode is not selected when the processor 54 detects that the switch is off. In other embodiments, the electronic cigarette may provide a display with a touch unit for the user to select a temperature control mode. If the processor 54 determines that the temperature control mode is selected, the procedure goes to step 505. If the processor 54 determines that the temperature control mode is not selected, the procedure goes to step 510.

At step 505, the processor 54 can calculate the resistance value $R_L$ of the heating element 52. Then the procedure goes to step 506.

At step 506, the processor 54 can calculate the temperature T of the heating element 52 according to the resistance value $R_L$ of the heating element 52. Then the procedure goes to step 507.

At step 507, the processor 54 can compare the temperature T of the heating element 52 with the upper threshold of the operating temperature $T_H$ and the lower threshold of the operating temperature $T_L$. If the temperature T of the heating element 52 is greater than the upper threshold of the operating temperature $T_H$, the procedure goes to step 508. If the temperature T of the heating element 52 is less than the lower threshold of the operating temperature $T_L$, the procedure goes to step 511.

At step 508, the processor 54 can control the power supply 51 to reduce the output voltage/the output power to the heating element 52. Then the procedure goes to step 509.

At step 509, the heating element 52 can work for a period at the adjusted output voltage/the adjusted output power. Then, the procedure goes to step 505, and repeats the subsequent processing. In at least one embodiment, the period can be one second, two seconds, five seconds or the like.

At step 510, the processor 54 can automatically control the power supply 51 to output a constant voltage/a constant power to the heating element 52, or the processor 54 can control the power supply 51 to output a selected voltage/a selected output power to the heating element 52.

At step 511, the processor 54 can determine whether the output voltage/the output power from the power supply 51 to the heating element 52 reaches a predetermined upper threshold value. If the output voltage/the output power from the power supply 51 to the heating element 52 reaches the predetermined upper threshold value, the procedure goes to step 512. If the output voltage/the output power from the power supply 51 to the heating element 52 doesn't reach the predetermined upper threshold value, the procedure goes to step 513.

At step 512, the processor 54 can control the power supply 51 to maintain the output voltage/the output power to the heating element 52. Then the procedure goes to step 509.

At step 513, the processor 54 can control the power supply 51 to increase the output voltage/the output power to the heating element 52. Then the procedure goes to step 509.

In other embodiments, the step 505 can be omitted, the processor 54 can calculate the temperature T of the heating element 52 according to the resistance value $R_L$ of the heating element 52 calculated at step 502 in the first cycle.

Figure 12:
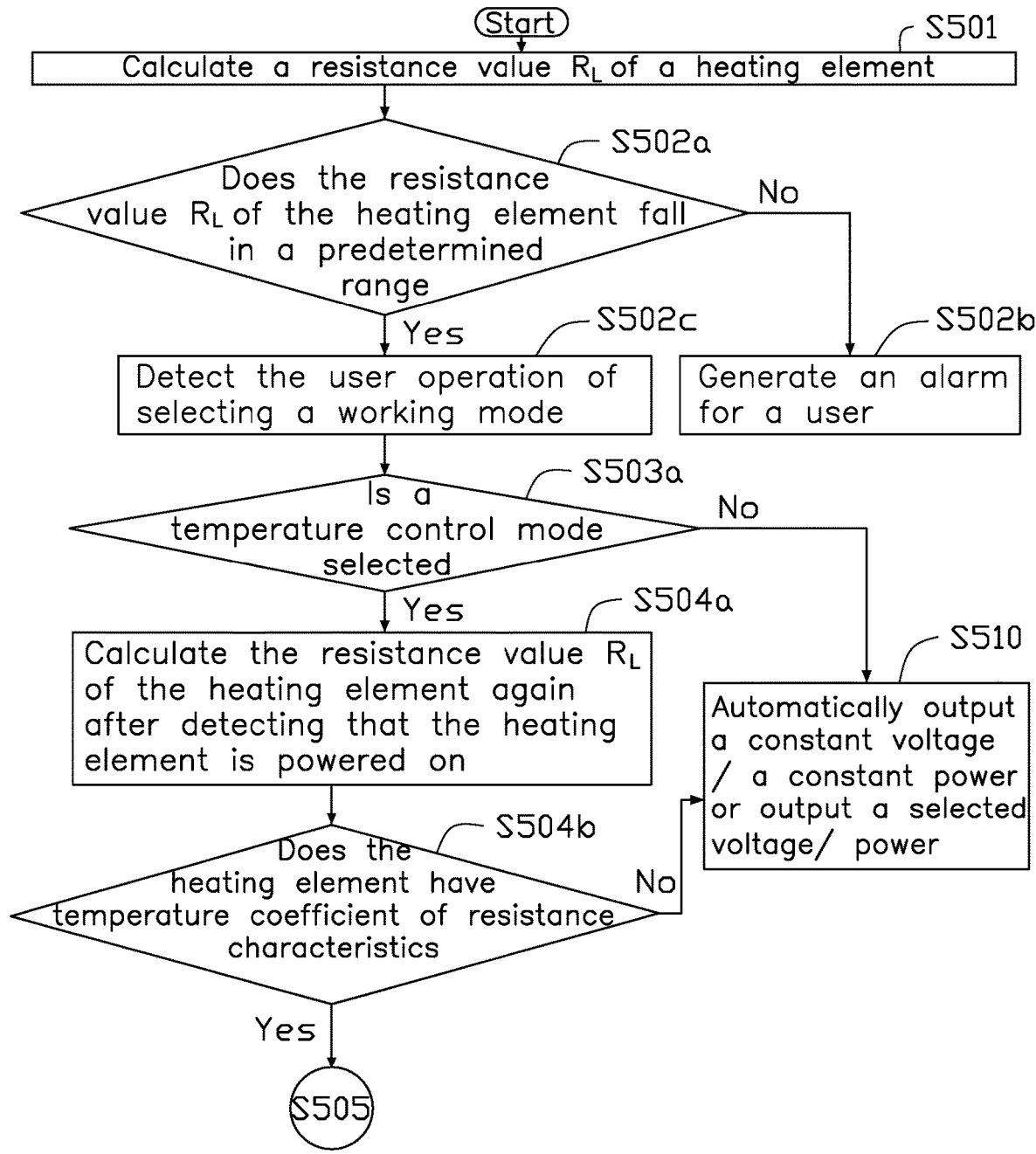
FIGS. 12-13 illustrate a flowchart of another embodiment of a fifth embodiment of the electronic cigarette temperature control method
Figure 13:
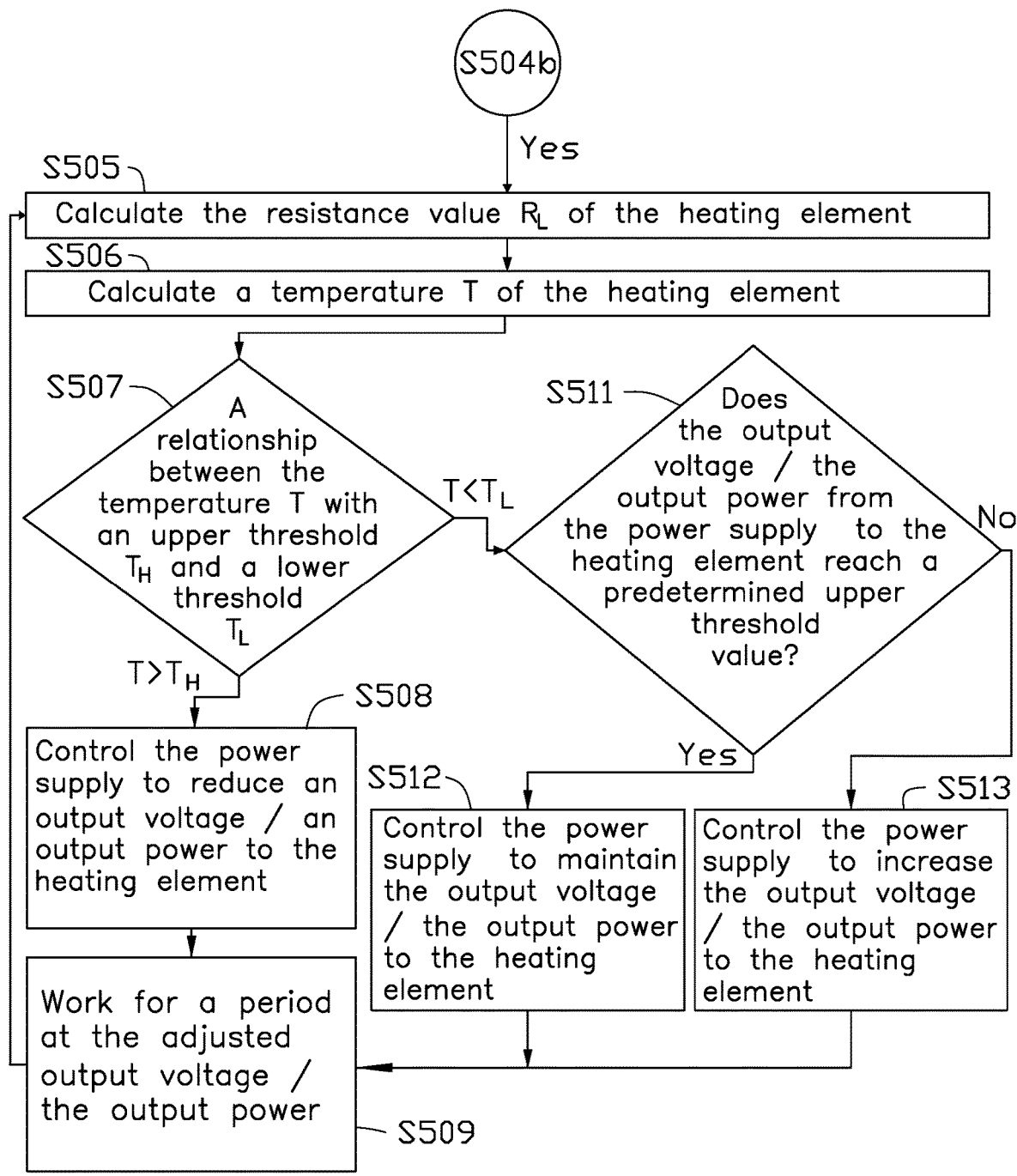

In other embodiments, as shown in FIGS. 12-13, the step 502, step 503, and step 504 can be replaced by the following step 502a, step 502b, step 502c, step 503a, step 504a, and step 504b. After step 501, the procedure goes to step 502a.

At step 502a, the processor 54 can determine whether the resistance value $R_L$ of the heating element 52 is within a predetermined range. Thus, in a way, the processor 54 can determine whether the heating element 52 is work normal. For example, when the resistance value $R_L$ of the heating element 52 is greater than an upper predetermined value, such as, the resistance value $R_L$ of the heating element 52 is infinite, the processor 54 can determine that the heating element 52 is open. When the resistance value $R_L$ of the heating element 52 is less than a lower predetermined value, such as, the resistance value $R_L$ of the heating element 52 is infinitesimal, the processor 54 can determine that the heating element 52 is short. In other ways, the processor 54 can determine whether the power supply is overload via determining whether the resistance value $R_L$ of the heating element 52 is within the predetermined range. If the resistance value $R_L$ of the heating element 52 is not within the predetermined range, the procedure goes to step 502b. If the resistance value $R_L$ of the heating element 52 is within the predetermined range, the procedure goes to step 502c.

At step 502b, the processor 54 can generate an alarm for a user.

At step 502c, the processor 54 can detect the user operation of selecting a working mode. Then the procedure goes to step 503a.

At step 503a, the processor 54 can determine whether a temperature control mode is selected. If the processor 54 determines that the temperature control mode is selected, the procedure goes to step 504a. If the processor 54 determines that the temperature control mode is not selected, the procedure goes to step 510.

At step 504a, the processor 54 can calculate the resistance value $R_L$ of the heating element 52 again after the processor 54 detects that the heating element 52 is powered on. Then the procedure goes to step 504b. In at least one embodiment, when the processor 54 detects that a button or a pressure sensor is activated, the processor 54 detects that the heating element 52 is powered on. In at least one embodiment, when the user pushes the button, or (in some variations) activates a pressure sensor by inhaling, or the like, the processor 54 detects that the button or the pressure sensor is activated.

At step 504b, the processor 54 can determine whether the heating element 52 has temperature coefficient of resistance characteristics according to the resistance value $R_L$ calculated at step 501 and the resistance value $R_L$ calculated at step 504a. If a difference between the resistance value $R_L$ calculated at step 501 and the resistance value $R_L$ calculated at step 504a is out of a preset range, the heating element 52 can have temperature coefficient of resistance characteristics, the procedure goes to step 505. If the difference between the resistance value $R_L$ calculated at step 501 and the resistance value $R_L$ calculated at step 504a is no significant or is in the preset range, the heating element 52 doesn't have temperature coefficient of resistance characteristics, the procedure goes to step 510. In at least one embodiment, the aim that the processor 54 determines whether the heating element 52 has temperature coefficient of resistance characteristics after the temperature control mode is selected by the user and the procedure goes to step 510 if the heating element 52 doesn't have temperature coefficient of resistance characteristics, is to prevent that the temperature control mode is selected by mistake when the heating element 52 has not temperature coefficient of resistance characteristics.

In other embodiments, the step 505 can be omitted, the processor 54 can calculate the temperature T of the heating element 52 according to the resistance value $R_L$ of the heating element 52 calculated at step 504a in the first cycle.

In other embodiments, the electronic cigarette temperature control system 500 can further include a display. The display can be configured to display information about work state of the electronic cigarette, such as, a temperature T of the heating element, a battery power, a work voltage, an output power, or the like.

Figure 14:
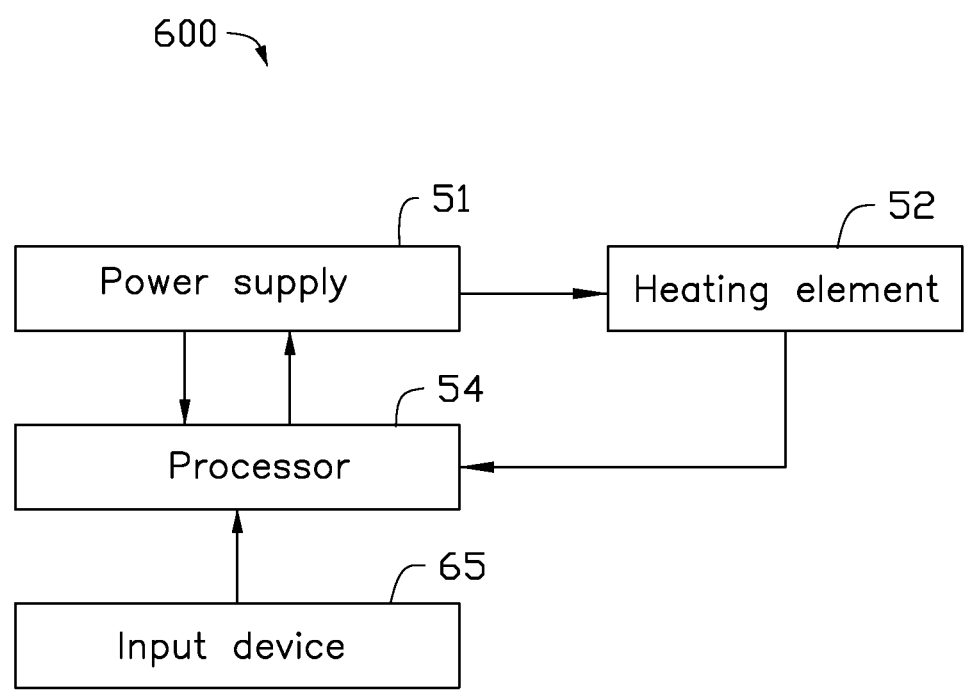
FIG. 14 illustrates a circuit schematic diagram of a sixth embodiment of the electronic cigarette temperature control system.

FIG. 14 illustrates a sixth embodiment of the electronic cigarette temperature control system 600. The electronic cigarette temperature control system 600 of the sixth embodiment can be similar to the electronic cigarette temperature control system 500 of the fifth embodiment, except that:

The electronic cigarette temperature control system 600 can further include an input device 65 electrically coupled to the processor 54. The user can input a desired target temperature $T_D$ via the input device 65. The desired target temperature $T_D$ is greater than or equal to the lower threshold of the operating temperature $T_L$ and is less than or equal to the upper threshold of the operating temperature $T_H$. The heating element 52 can be controlled by the processor 54 to maintain to work at a temperature $T_D \pm \Delta t'$. Where $\Delta t'$ represents a temperature deviation generated by a certain lag of a response time of the power supply 51, the heating unit 52, and the processor 54.

Figure 15:
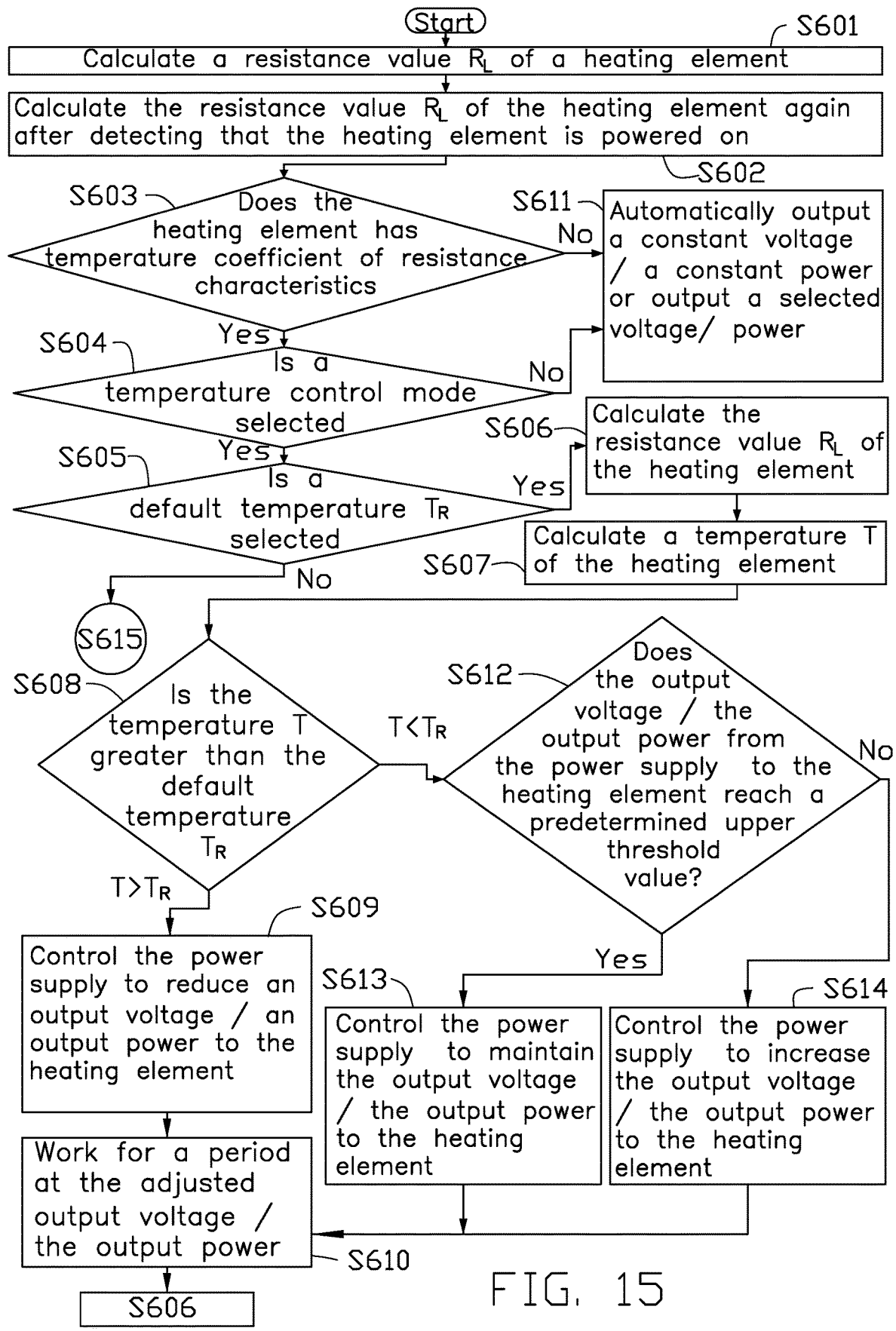
FIGS. 15-16 illustrate a flowchart of an embodiment of a sixth embodiment of the electronic cigarette temperature control method.
Figure 16:
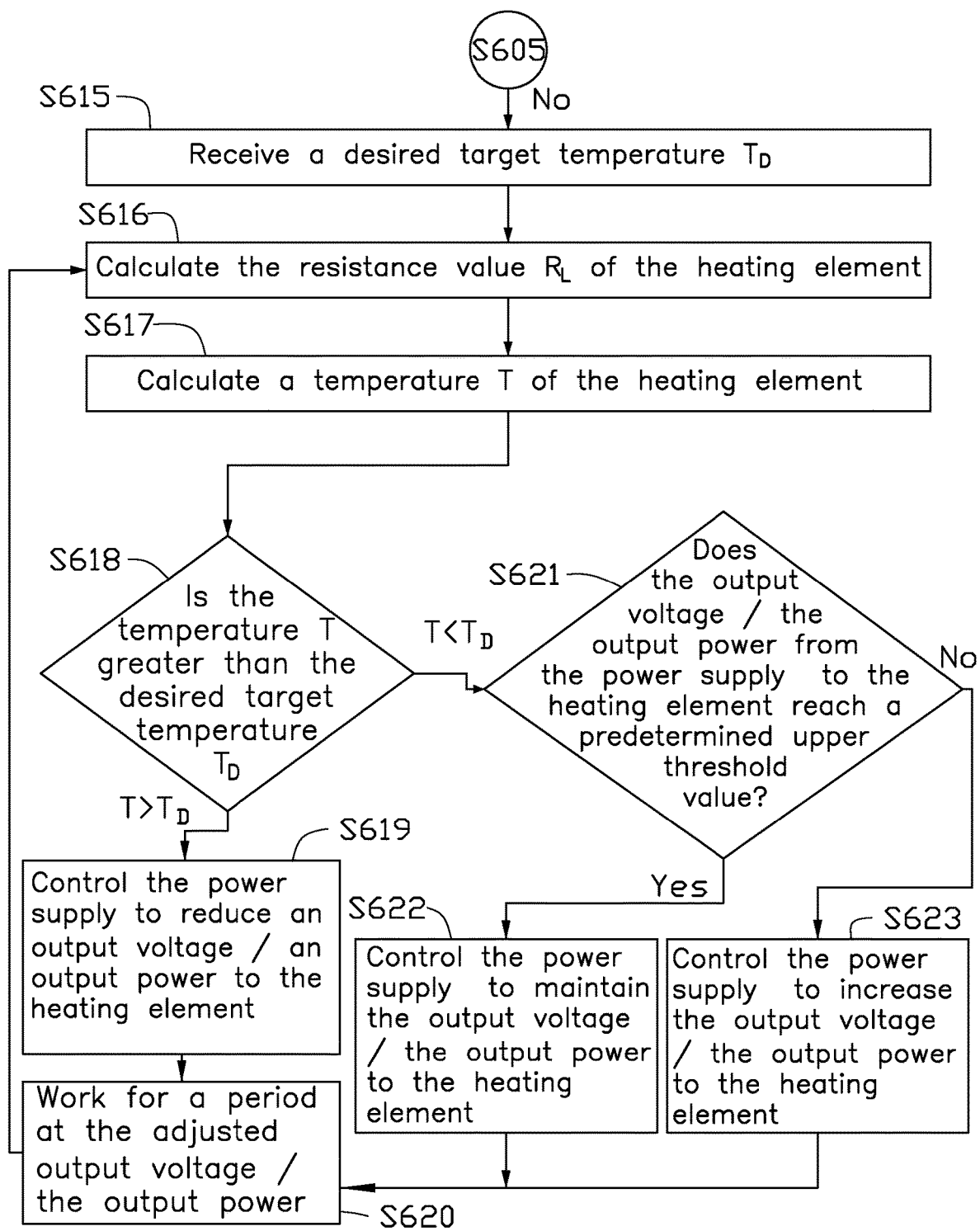

Referring to FIGS. 15-16, a flowchart of the electronic cigarette temperature control method is shown. The electronic cigarette temperature control method described below can be carried out using the configurations of the electronic cigarette temperature control system 600 illustrated in FIG. 14, for example, and various elements of these figures are referenced in the explanation of method. The electronic cigarette temperature control method includes the following steps:

At step 601, the processor 54 can calculate the resistance value $R_L$ of the heating element 52 before the heating element 52 is powered on. Then the procedure goes to step 602.

At step 602, the processor 54 can calculate the resistance value $R_L$ of the heating element 52 again after the processor 54 detects that the heating element 52 is powered on. Then the procedure goes to step 603. In at least one embodiment, when the processor 54 detects that a button or a pressure sensor is activated, the processor 54 detects that the heating element 52 is powered on. In at least one embodiment, when the user pushes the button, or (in some variations) activates a pressure sensor by inhaling, or the like, the processor 54 detects that the button or the pressure sensor is activated.

At step 603, the processor 54 can determine whether the heating element 52 has temperature coefficient of resistance characteristics according to the resistance value $R_L$ calculated at step 601 and the resistance value $R_L$ calculated at step 602. If a difference between the resistance value $R_L$ calculated at step 601 and the resistance value $R_L$ calculated at step 602 is out of a preset range, the heating element 52 has temperature coefficient of resistance characteristics, the procedure goes to step 604. If the difference between the resistance value $R_L$ calculated at step 601 and the resistance value $R_L$ calculated at step 602 is no significant or is in a preset range, the heating element 52 doesn't have temperature coefficient of resistance characteristics, the procedure goes to step 611.

At step 604, the processor 54 can determine whether a temperature control mode is selected. In at least one embodiment, the electronic cigarette may provide a switch for the user to operate. The processor 54 can determine that the temperature control mode is selected when the processor 54 detects that the switch is on. The processor 54 can determine that the temperature control mode is not selected when the processor 54 detects that the switch is off. In other embodiments, the electronic cigarette may provide a display with a touch unit for the user to select a temperature control mode. If the processor 54 determines that the temperature control mode is selected, the procedure goes to step 605. If the processor 54 determines that the temperature control mode is not selected, the procedure goes to step 611.

At step 605, the processor 54 can determine whether a default temperature $T_R$ is selected by the user. The default temperature $T_R$ is greater than or equal to the lower threshold of the operating temperature $T_L$ and is less than or equal to the upper threshold of the operating temperature $T_H$. The default temperature $T_R$ can be a temperature recommended by a manufacturer and pre-stored in the processor 54 or a temperature set by the user in the time of the last use. If the processor 54 determines that the default temperature $T_R$ is selected by the user, the procedure goes to step 606. If the processor 54 determines that the default temperature $T_R$ is not selected by the user, the procedure goes to step 615.

At step 606, the processor 54 can calculate the resistance value $R_L$ of the heating element 52. Then the procedure goes to step 607.

At step 607, the processor 54 can calculate the temperature T of the heating element 52 according to the resistance value $R_L$ of the heating element 52. Then the procedure goes to step 608.

At step 608, the processor 54 can compare the temperature T of the heating element 52 with the default temperature $T_R$. If the temperature T of the heating element 52 is greater than the default temperature $T_R$, the procedure goes to step 609. If the temperature T of the heating element 52 is less than the default temperature $T_R$, the procedure goes to step 612.

At step 609, the processor 54 can control the power supply 51 to reduce the output voltage/the output power to the heating element 52. Then the procedure goes to step 610.

At step 610, the heating element 52 can work for a period at the adjusted output voltage/the adjusted output power. Then, the procedure goes to step 606, and repeats the subsequent processing. In at least one embodiment, the period can be one second, two seconds, five seconds or the like.

At step 611, the processor 54 can automatically control the power supply 51 to output a constant voltage/a constant power to the heating element 52, or the processor 54 can control the power supply 51 to output a selected voltage/a selected power to the heating element 52.

At step 612, the processor 54 can determine whether the output voltage/the output power from the power supply 51 to the heating element 52 reaches a predetermined upper threshold value. If the output voltage/the output power from the power supply 51 to the heating element 52 reaches the predetermined upper threshold value, the procedure goes to step 613. If the output voltage/the output power from the power supply 51 to the heating element 52 doesn't reach the predetermined upper threshold value, the procedure goes to step 614.

At step 613, the processor 54 can control the power supply 51 to maintain the output voltage/the output power to the heating element 52. Then the procedure goes to step 610.

At step 614, the processor 54 can control the power supply 51 to increase the output voltage/the output power to the heating element 52. Then the procedure goes to step 610.

At step 615, the processor 54 can receive a desired target temperature $T_D$ inputted from the user via the input device 65. The desired target temperature $T_D$ is greater than or equal to the lower threshold of the operating temperature $T_L$ and is less than or equal to the upper threshold of the operating temperature $T_H$. Then the procedure goes to step 616.

At step 616, the processor 54 can calculate the resistance value $R_L$ of the heating element 52. Then the procedure goes to step 617.

At step 617, the processor 54 can calculate the temperature T of the heating element 52 according to the resistance value $R_L$ of the heating element 52. Then the procedure goes to step 618.

At step 618, the processor 54 can compare the temperature T of the heating element 52 with the desired target temperature $T_D$. If the temperature T of the heating element 52 is greater than the desired target temperature $T_D$, the procedure goes to step 619. If the temperature T of the heating element 52 is less than the desired target temperature $T_D$, the procedure goes to step 621.

At step 619, the processor 54 can control the power supply 51 to reduce the output voltage/the output power to the heating element 52. Then the procedure goes to step 620.

At step 620, the heating element 52 can work for a period at the adjusted output voltage/the adjusted output power. Then, the procedure goes to step 616, and repeats the subsequent processing. In at least one embodiment, the period can be one second, two seconds, five seconds or the like.

At step 621, the processor 54 can determine whether the output voltage/the output power from the power supply 51 to the heating element 52 reaches a predetermined upper threshold value. If the output voltage/the output power from the power supply 51 to the heating element 52 reaches the predetermined upper threshold value, the procedure goes to step 622. If the output voltage/the output power from the power supply 51 to the heating element 52 doesn't reach the predetermined upper threshold value, the procedure goes to step 623.

At step 622, the processor 54 can control the power supply 51 to maintain the output voltage/the output power to the heating element 52. Then the procedure goes to step 620.

At step 623, the processor 54 can control the power supply 51 to increase the output voltage/the output power to the heating element 52. Then the procedure goes to step 620.

Figure 17:
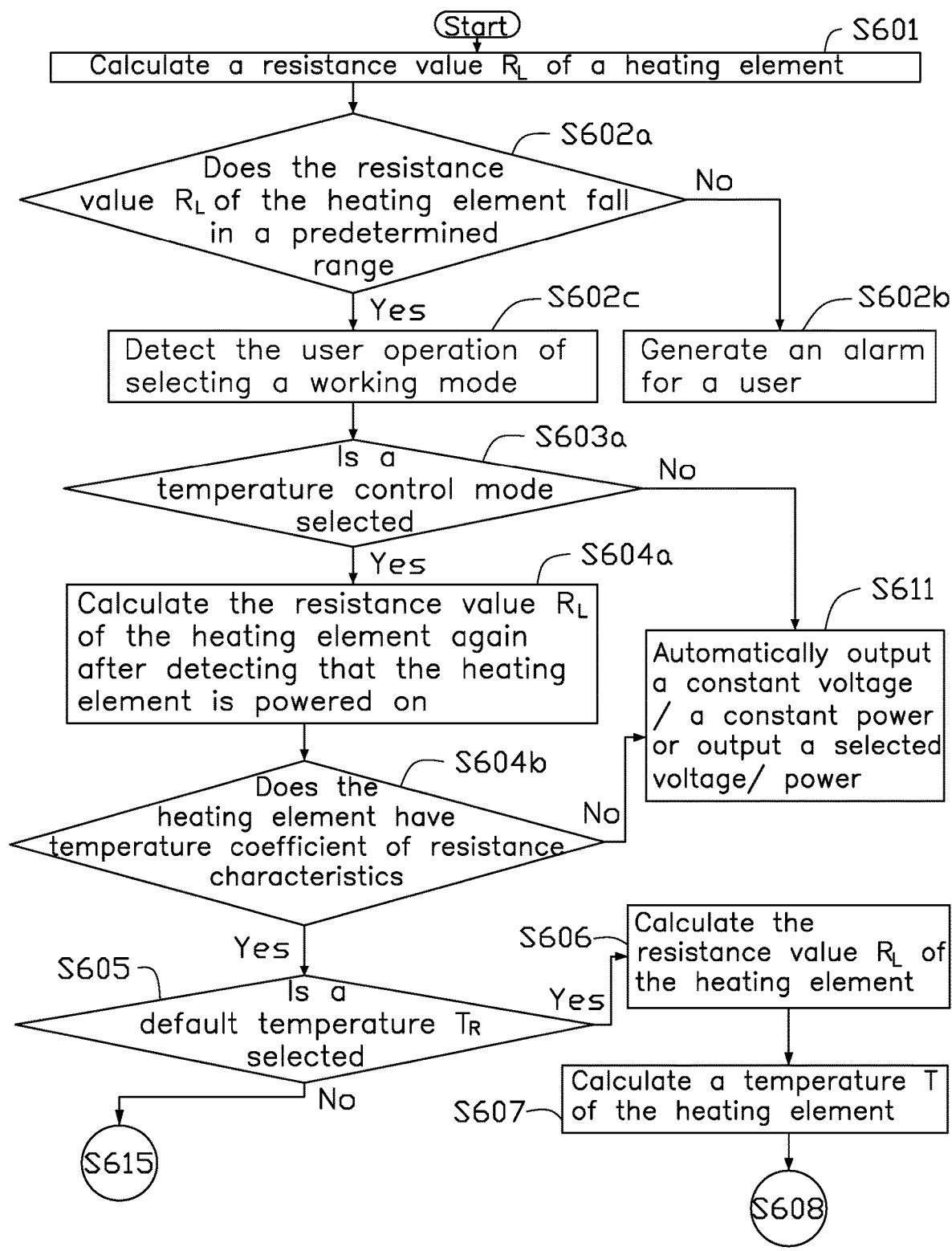
FIGS. 17-19 illustrate a flowchart of another embodiment of a sixth embodiment of the electronic cigarette temperature control method.
Figure 18:
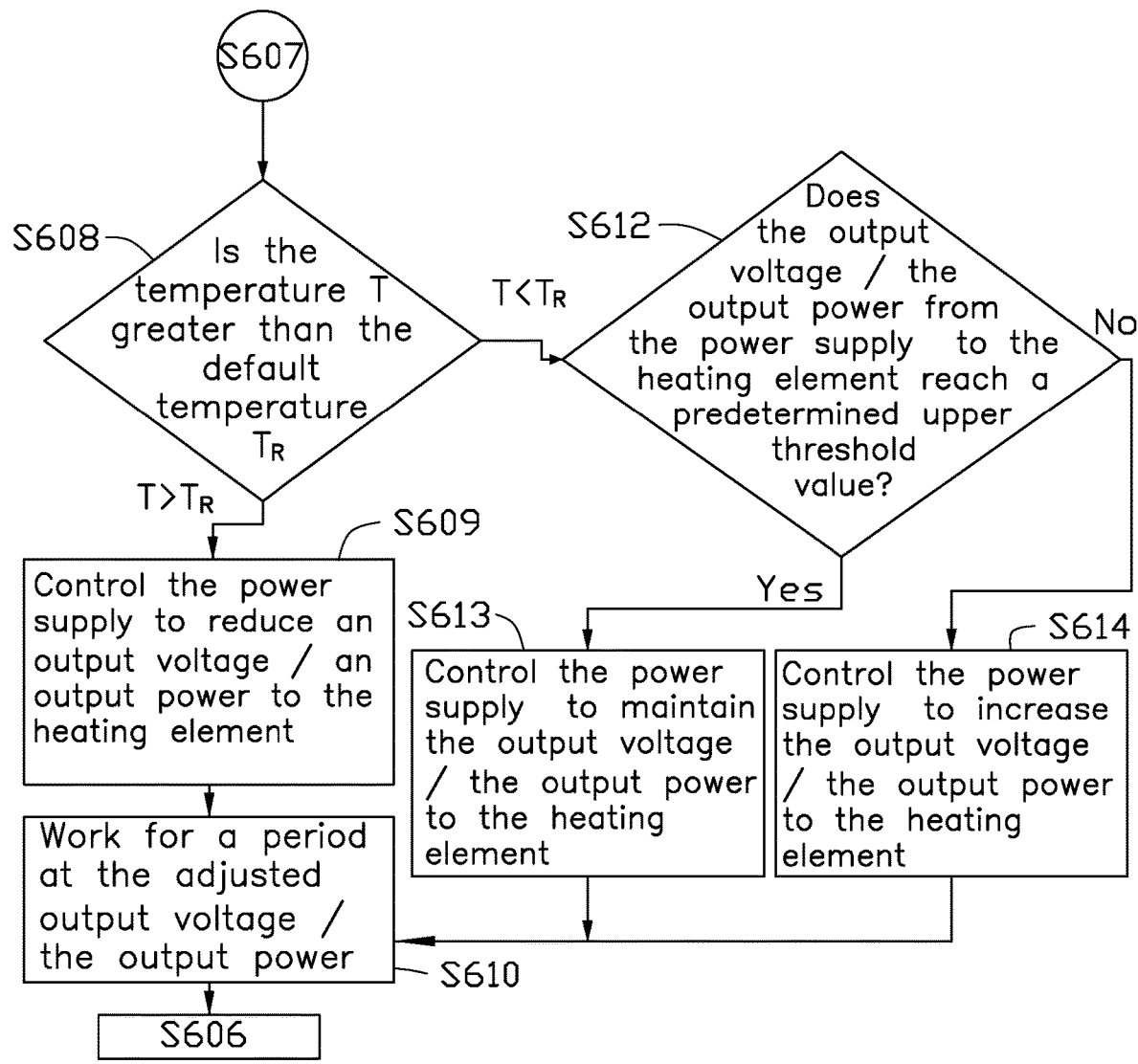
Figure 19:
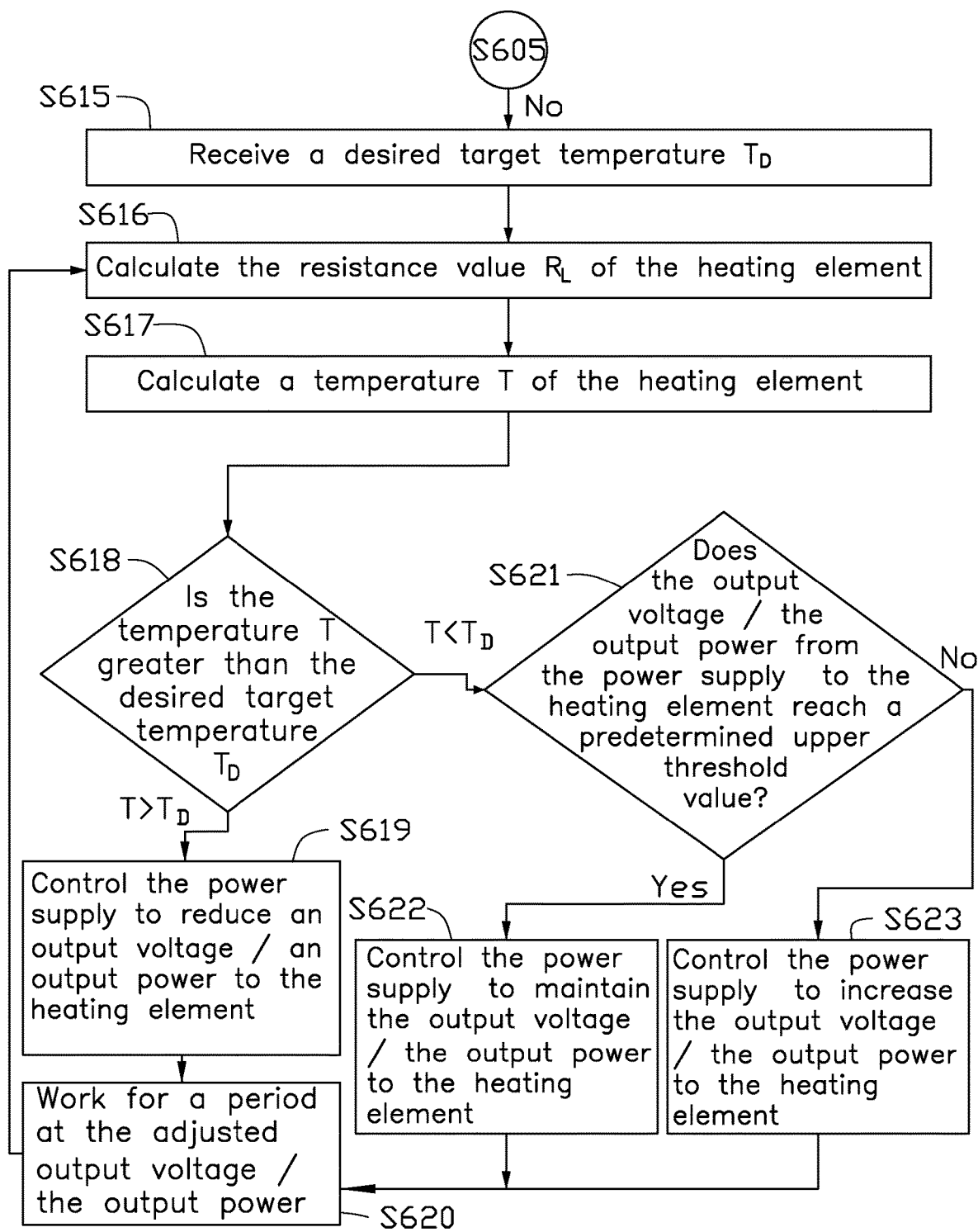

In other embodiments, as shown in FIGS. 17-19, the step 602, step 603, and step 604 can be replaced by the following step 602a, step 602b, step 602c, step 603a, step 604a, and step 604b. After step 601, the procedure goes to step 602a.

At step 602a, the processor 54 can determine whether the resistance value $R_L$ of the heating element 52 is within a predetermined range. Thus, in a way, the processor 54 can determine whether the heating element 52 is work normal. For example, when the resistance value $R_L$ of the heating element 52 is greater than an upper predetermined value, such as, the resistance value $R_L$ of the heating element 52 is infinite, the processor 54 can determine that the heating element 52 is open. When the resistance value $R_L$ of the heating element 52 is less than a lower predetermined value, such as, the resistance value $R_L$ of the heating element 52 is infinitesimal, the processor 54 can determine that the heating element 52 is short. In other ways, the processor 54 can determine whether the power supply is overload via determining whether the resistance value $R_L$ of the heating element 52 is within the predetermined range. If the resistance value $R_L$ of the heating element 52 is not within the predetermined range, the procedure goes to step 602b. If the resistance value $R_L$ of the heating element 52 is within the predetermined range, the procedure goes to step 602c.

At step 602b, the processor 54 can generate an alarm for a user.

At step 602c, the processor 54 can detect the user operation of selecting a working mode. Then the procedure goes to step 603a.

At step 603a, the processor 54 can determine whether a temperature control mode is selected. If the processor 54 determines that the temperature control mode is selected, the procedure goes to step 604a. If the processor 54 determines that the temperature control mode is not selected, the procedure goes to step 611.

At step 604a, the processor 54 can calculate the resistance value $R_L$ of the heating element 52 again after the processor 54 detects that the heating element 52 is powered on. Then the procedure goes to step 604b. In at least one embodiment, when the processor 54 detects that a button or a pressure sensor is activated, the processor 54 detects that the heating element 52 is powered on. In at least one embodiment, when the user pushes the button, or (in some variations) activates a pressure sensor by inhaling, or the like, the processor 54 detects that the button or the pressure sensor is activated.

At step 604b, the processor 54 can determine whether the heating element 52 has temperature coefficient of resistance characteristics according to the resistance value $R_L$ calculated at step 601 and the resistance value $R_L$ calculated at step 604a. If a difference between the resistance value $R_L$ calculated at step 601 and the resistance value $R_L$ calculated at step 604a is out of a preset range, the heating element 52 can have temperature coefficient of resistance characteristics, the procedure goes to step 605. If the difference between the resistance value $R_L$ calculated at step 601 and the resistance value $R_L$ calculated at step 604a is no significant or is in the preset range, the heating element 52 doesn't have temperature coefficient of resistance characteristics, the procedure goes to step 611. In at least one embodiment, the aim that the processor 54 determines whether the heating element 52 has temperature coefficient of resistance characteristics after the temperature control mode is selected by the user and the procedure goes to step 611 if the heating element 52 doesn't have temperature coefficient of resistance characteristics, is to prevent that the temperature control mode is selected by mistake when the heating element 52 has not temperature coefficient of resistance characteristics.

In other embodiments, if the processor 54 detect that no desired target temperature $T_D$ is inputted from the user and there is no default temperature $T_R$, the steps of the electronic cigarette temperature control method of the sixth embodiment can be the same as the electronic cigarette temperature control method of the fifth embodiment.

In other embodiments, the electronic cigarette temperature control system 600 can further include a display. The display can be configured to display information about work state of the electronic cigarette, such as, a temperature T of the heating element, a battery power, a work voltage, an output power, or the like.

Figure 20:
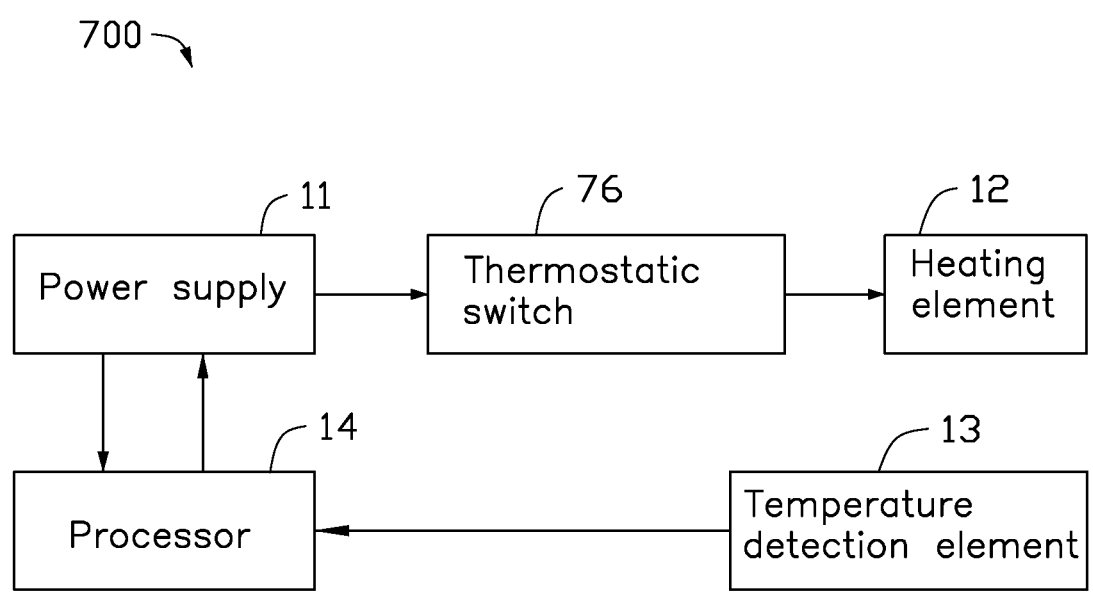
FIG. 20 illustrates a circuit schematic diagram of a seventh embodiment of the electronic cigarette temperature control system.

FIG. 20 illustrates a seventh embodiment of the electronic cigarette temperature control system 700. The electronic cigarette temperature control system 700 of the seventh embodiment can be similar to the electronic cigarette temperature control system 100 of the first embodiment, except that:

In the seventh embodiment, the electronic cigarette temperature control system 700 can further include a thermostatic switch 76 coupled between the power supply 11 and the heating element 12. The thermostatic switch 76 can turn on a connection between the power supply 11 and the heating element 12 or turn off the connection between the power supply 11 and the heating element 12 at a temperature of action. The thermostatic switch 76 can be arranged in the electronic cigarette. In at least one embodiment, the thermostatic switch 76 can be arranged to be adjacent to the heating element 12. Considering that the temperature $t_s$ of the thermostatic switch 76 is slightly less than the temperature T of the heating element 12, in at least one embodiment, the switching temperature $T_M$ of the thermostatic switch 76 is slightly less than the upper threshold of the operating temperature $T_H$. For example, the switching temperature $T_M$ of the thermostatic switch 76 is 225° C., and the upper threshold of the operating temperature $T_H$ is 220° C. In at least one embodiment, the thermostatic switch 76 can be selected from one of a group consisting of a mechanical thermostat switch, an electronic thermostat switch, a temperature relay, and any combination thereof. The mechanical thermostat switch can be a vapor pressure thermostat switch, a liquid expansion thermostat switch, a gas adsorption thermostat switch, or a metal expansion thermostat switch. The metal expansion thermostat switch can be a bimetal switch or a memory alloy actuated heat switch. The electronic thermostat switch can be a resistance thermostat switch or a thermocouple thermostat switch. The temperature relay can be a thermal reed relay.

When the temperature $t_s$ of the thermostatic switch 76 is less than the switching temperature $T_M$ of the thermostatic switch 76, the steps of the electronic cigarette temperature control method carried out using the configurations of the electronic cigarette temperature control system 700 illustrated in FIG. 20 can be the same as the steps of the electronic cigarette temperature control method carried out using the configurations of the electronic cigarette temperature control system 100 of the first embodiment, thereby doesn't described again herein. When the temperature $t_s$ of the thermostatic switch 76 is greater than the switching temperature $T_M$ of the thermostatic switch 76, the thermostatic switch 76 can turn off. The power supply 11 can stop powering the heating element 12. The temperature T of the heating element 12 can according naturally decrease and the temperature $t_s$ of the thermostatic switch 76 can decrease accordingly until that the temperature $t_s$ of the thermostatic switch 76 is less than the switch temperature $T_M$ of the thermostatic switch 76. When the temperature $t_s$ of the thermostatic switch 76 is less than the switch temperature $T_M$ of the thermostatic switch 76, the thermostatic switch 76 can turn on the connection between the power supply 11 and the heating element 12 again, thus the heating element 12 can work normally again as the first embodiment. Thus, the electronic cigarette can execute a double temperature control protection, especially when the temperature detection element 13 and/or the processor 14 is malfunctioned, the electronic cigarette can still control the temperature of heating element 12.

In other embodiments, the second embodiment can be varied with reference to the seventh embodiment, namely, the electronic cigarette temperature control system 700 can further include a thermostatic switch coupled between the power supply 21 and the heating element 22, thereby executing a double temperature control protection.

In other embodiments, the fifth embodiment and the sixth embodiment can be varied with reference to the seventh embodiment: the electronic cigarette temperature control system can further include a thermostatic switch coupled between the power supply and the heating element. When the heating element has temperature coefficient of resistance characteristics, the electronic cigarette of the fifth embodiment and the sixth embodiment can execute a double temperature control protection. When the heating element doesn't have temperature coefficient of resistance characteristics, the steps of the electronic cigarette temperature control method carried out using the configurations of the electronic cigarette temperature control system of the fifth embodiment and the sixth embodiment can be the same as the steps of the electronic cigarette temperature control method carried out using the configurations of the electronic cigarette temperature control system of the third embodiments, thereby doesn't described again herein.

Figure 21:
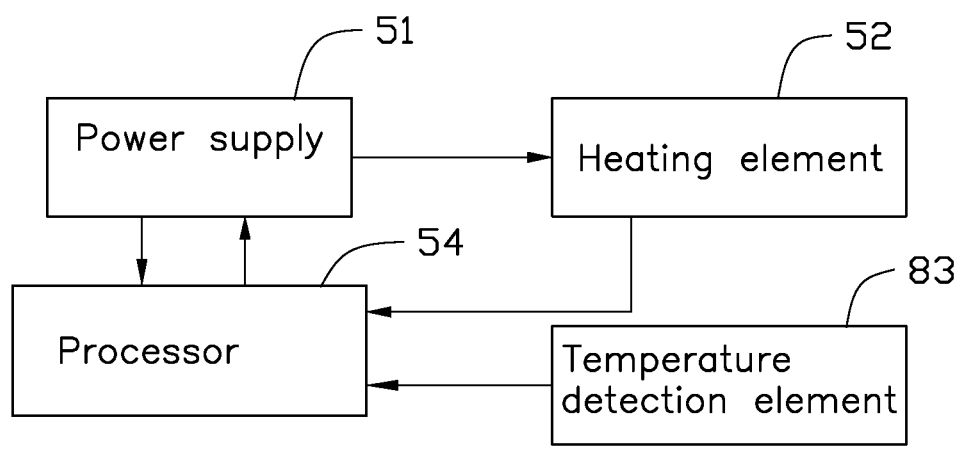
FIG. 21 illustrates a circuit schematic diagram of an eighth embodiment of the electronic cigarette temperature control system.

FIG. 21 illustrates an eighth embodiment of the electronic cigarette temperature control system 800. The electronic cigarette temperature control system 800 of the eighth embodiment can be similar to the electronic cigarette temperature control system 500 of the fifth embodiment, except that:

The electronic cigarette temperature control system 800 can further include at least one temperature detection element 83 electrically coupled to the processor 54. When the heating element 52 has temperature coefficient of resistance characteristics, the electronic cigarette of the eighth embodiment can execute a temperature control as the fifth embodiment. When the heating element 52 doesn't have temperature coefficient of resistance characteristics, the electronic cigarette of the eighth embodiment can execute a temperature control as the first embodiment. Alternatively, the electronic cigarette temperature control system 800 can further include a thermostatic switch electrically coupled to the processor. When the heating element 52 doesn't have temperature coefficient of resistance characteristics, the electronic cigarette temperature control system 800 of the eighth embodiment can execute a temperature control as the fourth embodiment.

The electronic cigarette temperature control system can have the following beneficial effect:

When the user employs the heating element of the atomizer assembly portion which has temperature coefficient of resistance characteristics, the electronic cigarette of the eighth embodiment can execute a temperature control as the fifth embodiment. When the user employs the heating element of the atomizer assembly portion which doesn't have temperature coefficient of resistance characteristics, the electronic cigarette of the eighth embodiment can execute a temperature control as the first embodiment. When the user employs the heating element of the atomizer assembly portion which doesn't have temperature coefficient of resistance characteristics and the temperature detection element 83 is replaced by a thermostatic switch, the electronic cigarette of the eighth embodiment can execute a temperature control as the fourth embodiment. Thus, the versatility of the electronic cigarette temperature control system and the electronic cigarette can increase.

In an alternative embodiment, the electronic cigarette temperature control system can further include a thermostatic switch coupled between the power supply 51 and the heating element 52 for executing a double temperature control protection. Especially, when the temperature detection element 83 and/or the processor 54 is malfunctioned, the electronic cigarette can still control the temperature of the heating element 52.

Figure 22:
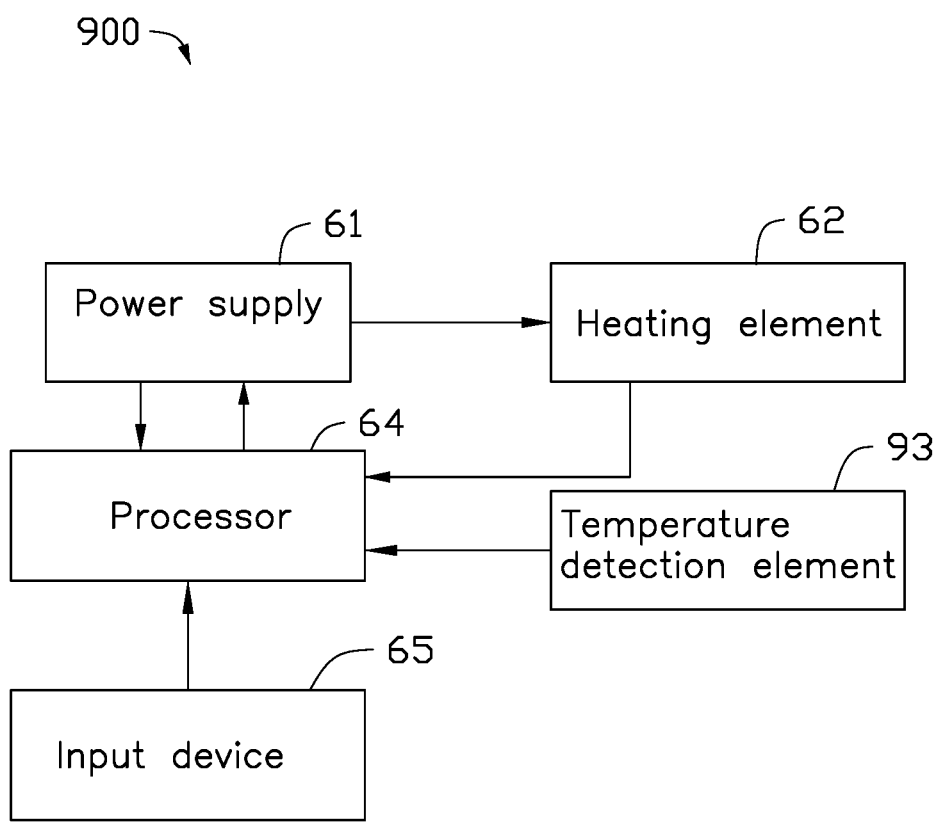
FIG. 22 illustrates a circuit schematic diagram of a ninth embodiment of the electronic cigarette temperature control system.

FIG. 22 illustrates a ninth embodiment of the electronic cigarette temperature control system 900. The electronic cigarette temperature control system 900 of the ninth embodiment can be similar to the electronic cigarette temperature control system 600 of the sixth embodiment, except that:

The electronic cigarette temperature control system 900 can further include a temperature detection element 93 electrically coupled to the processor 64. When the heating element 62 has temperature coefficient of resistance characteristics, the heating element 62 of the electronic cigarette temperature control system 900 of the ninth embodiment can be maintained to work at the temperature $T_D \pm \Delta t'$ as the sixth embodiment. When the heating element 62 doesn't have temperature coefficient of resistance characteristics, the heating element 62 of the electronic cigarette temperature control system 900 of the ninth embodiment can be maintained to work at the temperature $T_D \pm \Delta t'$ as the second embodiment.

In other embodiments, the electronic cigarette temperature control system 900 can further include a thermostatic switch coupled between the power supply 61 and the heating element 62, thereby executing a double temperature control protection.

Figure 23:
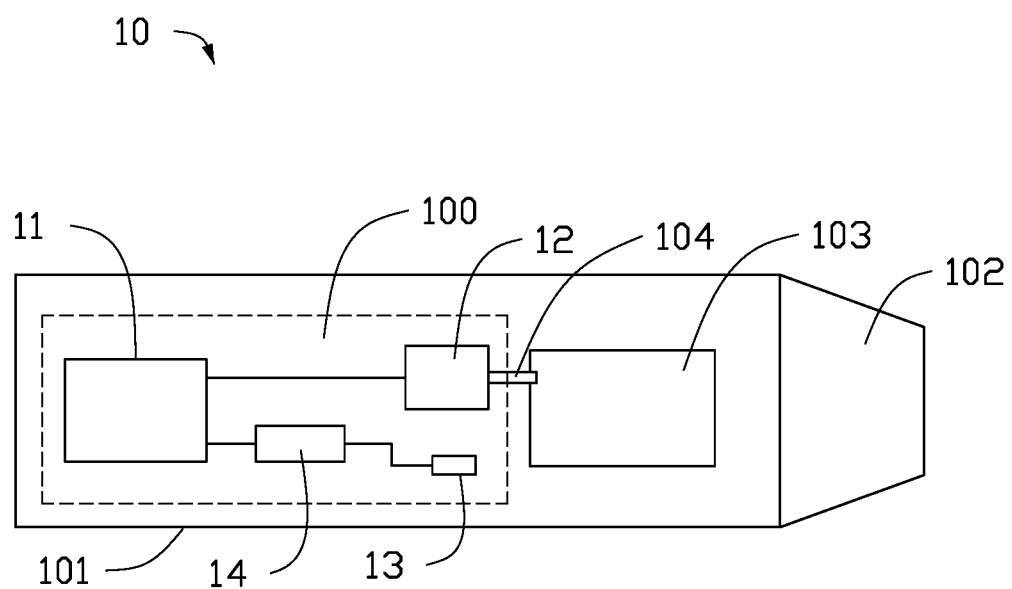
FIG. 23 illustrates a schematic view of an electronic cigarette.

FIG. 23 illustrates an electronic cigarette 10. The electronic cigarette 10 can include a housing 101, a mouthpiece 102, a liquid tank 103, a liquid guiding component 104, and an electronic cigarette temperature control system 100. The electronic cigarette temperature control system 100 can have a liquid communication with the liquid tank 103 via the liquid guiding component 104. The electronic cigarette temperature control system 100 can heat smoke liquid to generate vapor, and control the temperature of the heating element 12 within a reasonable range.

It will be appreciated that, the electronic cigarette temperature control system 100 can be replaced by any one from the electronic cigarette temperature control systems (200, 3000, 400, 500, 600, 700, 800, 900) of the second embodiment, the third embodiment, the fourth embodiment, the fifth embodiment, the sixth embodiment, the seventh embodiment, the eighth embodiment, and the ninth embodiment, or replaced by the electronic cigarette temperature control system modified from the electronic cigarette temperature control system (100, 200, 3000, 400, 500, 600, 700, 800, 900) of the first embodiment, the second embodiment, the third embodiment, the fourth embodiment, the fifth embodiment, the sixth embodiment, the seventh embodiment, the eighth embodiment, or the ninth embodiment.

It will be appreciated that, any one from the electronic cigarette temperature control systems of the first embodiment, the second embodiment, the third embodiment, the fourth embodiment, the fifth embodiment, the sixth embodiment, the seventh embodiment, the eighth embodiment, and the ninth embodiment can be applied in any electronic cigarette, but is not limited to the liquid guiding manner, the atomization manner, the types of the aerosol formation matrix (for example, smoke liquid, or wax or tobacco), the heating manner, and the likes. And any one from the electronic cigarette temperature control system modified from the electronic cigarette temperature control system of the first embodiment, the second embodiment, the third embodiment, the fourth embodiment, the fifth embodiment, the sixth embodiment, the seventh embodiment, the eighth embodiment, and the ninth embodiment can be applied in the any electronic cigarette, but is not limited to the liquid guiding manner, the atomization manner, the types of the aerosol formation matrix (for example, smoke liquid, or wax or tobacco), the heating manner, and the like.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including, the full extent established by the broad general meaning of the terms used in the claims.

What is claimed is:

1. A temperature control method for an electronic cigarette, applicable in an electronic cigarette temperature control system or an electronic cigarette with a power supply, a heating element and a processor, comprising:
    the processor calculating a resistance value $R_L$ of the heating element before the heating element is powered on;
    the processor determining whether the resistance value $R_L$ of the heating element is within a predetermined range;
    the processor determining whether a temperature control mode is selected when the resistance value $R_L$ of the heating element is within the predetermined range;
    the processor determining whether the heating element is adapted to the temperature control mode when the temperature control mode is selected;
    the processor controlling the heating element to operate in the temperature control mode when the heating element is adapted to the temperature control mode.

2. The temperature control method of claim 1, further comprising: the processor generating an alarm when the resistance value $R_L$ of the heating element is not within the predetermined range.

3. The temperature control method of claim 1, further comprising: the processor detecting a current working mode before determining whether the heating element is adapted to the temperature control mode.

4. The temperature control method of claim 1, wherein the processor determining whether the heating element is adapted to the temperature control mode comprises:
    the processor calculating the resistance value $R_L$ of the heating element again after the heating element is powered on;
    the processor determining whether the heating element has temperature coefficient of resistance characteristics according to the resistance value $R_L$ of the heating element calculated before the heating element is powered and according to the resistance value $R_L$ of the heating element calculated after the heating element is powered;
    the heating element being adapted to the temperature control mode if the temperature coefficient of resistance characteristics of the heating element is determined.

5. The temperature control method of claim 4, further comprising: the processor controlling the heating element to operate in a voltage control mode or a power control mode if the temperature coefficient of resistance characteristics of the heating element is not determined.

6. The temperature control method of claim 5, wherein the processor controlling the heating element to operate in the voltage control mode or the power control mode comprises:
    the processor controlling to output a constant voltage or a constant power to the heating element automatically; or
    the processor controlling to output a selected voltage or a selected power to the heating element.

7. The temperature control method of claim 1, wherein the processor controlling the heating element to operate in the temperature control mode comprises:
    the processor calculating the resistance value $R_L$ of the heating element after the heating element is powered on;
    the processor calculating a temperature T of the heating element according to the resistance value $R_L$ of the heating element calculated after the heating element is powered on;
    the processor comparing the temperature T of the heating element with at least one reference temperature;
    the processor adjusting an output voltage or an output power of the power supply to the heating element according to a result of the comparison;
    the heating element operating at the adjusted output voltage or the adjusted output power.

8. The temperature control method of claim 7, wherein the at least one reference temperature comprises an upper threshold $T_H$ and a lower threshold $T_L$, the processor adjusting the output voltage or the output power of the power supply to the heating element according to the result of the comparison comprises:
    the processor controlling the power supply to reduce the output voltage or the output power to the heating element when the temperature T of the heating element being higher than the upper threshold $T_H$ is determined;
    the processor determining whether the output voltage or the output power from the power supply to the heating element reaches a predetermined upper threshold value when the temperature T of the heating element being lower than the lower threshold $T_L$ is determined;
    the processor controlling the power supply to maintain the output voltage or the output power to the heating element when the output voltage or the output power from the power supply to the heating element reaching the predetermined upper threshold value is determined;
    the processor controlling the power supply to increase the output voltage or the output power to the heating element when the output voltage or the output power from the power supply to the heating element being lower than the predetermined upper threshold value is determined.

9. The temperature control method of claim 7, wherein the at least one reference temperature comprises a default temperature $T_R$ or a desired target temperature $T_D$.

10. The temperature control method of claim 9, wherein before the processor comparing the temperature T of the heating element with the at least one reference temperature, the temperature control method further comprises:
    the processor determining whether the default temperature $T_R$ is selected;
    the at least one reference temperature is the default temperature $T_R$ when the default temperature $T_R$ is selected;
    the at least one reference temperature is the desired target temperature $T_D$ when the default temperature $T_R$ is not selected.

11. The temperature control method of claim 10, wherein the processor adjusting the output voltage or the output power of the power supply to the heating element according to the result of the comparison comprises:
    the processor controlling the power supply to reduce the output voltage or the output power to the heating element when the temperature T of the heating element being higher than the at least one reference temperature is determined;

the processor determining whether the output voltage or the output power from the power supply to the heating element reaches a predetermined upper threshold value when the temperature T of the heating element being lower than the at least one reference temperature is determined;

the processor controlling the power supply to maintain the output voltage or the output power to the heating element when the output voltage or the output power from the power supply to the heating element reaching the predetermined upper threshold value is determined;

the processor controlling the power supply to increase the output voltage or the output power to the heating element when the output voltage or the output voltage from the power supply to the heating element being lower than the predetermined upper threshold value is determined.

12. An electronic cigarette, comprising:
a processor;
a heating element electrically coupled to the processor; and
a power supply electrically coupled to the processor and the heating element;
wherein the processor is configured to:
calculate a resistance value $R_L$ of the heating element before the heating element is powered on;
determine whether the resistance value $R_L$ of the heating element is within a predetermined range;
determine whether a temperature control mode is selected when the resistance value $R_L$ of the heating element is within the predetermined range;
determine whether the heating element is adapted to the temperature control mode when the temperature control mode is selected; and
control the heating element to operate in the temperature control mode when the heating element is adapted to the temperature control mode.

13. The electronic cigarette of claim 12, wherein the heating element is adapted to the temperature control mode when temperature coefficient of resistance characteristics of the heating element is determined.

14. The electronic cigarette of claim 13, the processor is configured to:
calculate the resistance value $R_L$ of the heating element again after the heating element is powered on; and
determine whether the heating element has temperature coefficient of resistance characteristics according to the resistance value $R_L$ of the heating element calculated before the heating element is powered and according to the resistance value $R_L$ of the heating element calculated after the heating element is powered.

15. The electronic cigarette of claim 12, wherein the processor controls the heating element to operate in a voltage control mode or a power control mode when the heating element is not adapted to the temperature control mode.

16. The electronic cigarette of claim 12, wherein when the processor controls the heating element to operate in the temperature control mode, the processor is configured to:
calculate the resistance value $R_L$ of the heating element after the heating element is powered on;
calculate a temperature T of the heating element according to the resistance value $R_L$ of the heating element calculated after the heating element is powered on;
compare the temperature T of the heating element with at least one reference temperature; and
adjust an output voltage or an output power of the power supply to the heating element according to a result of the comparison.

17. The electronic cigarette of claim 16, wherein the at least one reference temperature comprises an upper threshold $T_H$ and a lower threshold $T_L$, the processor adjusting the output voltage or the output power of the power supply to the heating element according to the result comprises:
the processor controlling the power supply to reduce the output voltage or the output power to the heating element when the temperature T of the heating element being higher than the upper threshold $T_H$ is determined;
the processor determining whether the output voltage or the output power from the power supply to the heating element reaches a predetermined upper threshold value when the temperature T of the heating element being lower than the lower threshold $T_L$ is determined;
the processor controlling the power supply to maintain the output voltage or the output power to the heating element when the output voltage or the output power from the power supply to the heating element reaching the predetermined upper threshold value is determined; and
the processor controlling the power supply to increase the output voltage or the output power to the heating element when the output voltage or the output power from the power supply to the heating element being lower than the predetermined upper threshold value is determined.

18. The electronic cigarette of claim 16, wherein the at least one reference temperature comprises a default temperature $T_R$ or a desired target temperature $T_D$.

19. The electronic cigarette of claim 18, wherein the processor is configured to determine whether the default temperature $T_R$ is selected.

20. The electronic cigarette of claim 19, wherein the processor adjusting the output voltage or the output power of the power supply to the heating element according to the result comprises:
the processor controlling the power supply to reduce the output voltage or the output power to the heating element when the temperature T of the heating element being higher than the at least one reference temperature is determined;
the processor determining whether the output voltage or the output power from the power supply to the heating element reaches a predetermined upper threshold value when the temperature T of the heating element being lower than the at least one reference temperature is determined;
the processor controlling the power supply to maintain the output voltage or the output power to the heating element when the output voltage or the output power from the power supply to the heating element reaching the predetermined upper threshold value is determined;
the processor controlling the power supply to increase the output voltage or the output power to the heating element when the output voltage or the output voltage from the power supply to the heating element being lower than the predetermined upper threshold value is determined.

* * * * *